(12) United States Patent
Yufune

(10) Patent No.: US 12,296,832 B2
(45) Date of Patent: May 13, 2025

(54) DANGEROUS DRIVING WARNING DEVICE, DANGEROUS DRIVING WARNING SYSTEM, AND DANGEROUS DRIVING WARNING METHOD

(71) Applicant: JVCKENWOOD CORPORATION, Yokohama (JP)

(72) Inventor: Shuta Yufune, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 198 days.

(21) Appl. No.: 17/950,815

(22) Filed: Sep. 22, 2022

(65) Prior Publication Data

US 2023/0014192 A1 Jan. 19, 2023

Related U.S. Application Data

(63) Continuation of application No. PCT/JP2020/044274, filed on Nov. 27, 2020.

(30) Foreign Application Priority Data

| Mar. 24, 2020 | (JP) | 2020-052863 |
| Mar. 24, 2020 | (JP) | 2020-052864 |
| Mar. 24, 2020 | (JP) | 2020-052866 |

(51) Int. Cl.
*B60W 40/08* (2012.01)
*B60W 40/105* (2012.01)
(Continued)

(52) U.S. Cl.
CPC .......... *B60W 40/08* (2013.01); *B60W 40/105* (2013.01); *B60W 50/14* (2013.01);
(Continued)

(58) Field of Classification Search
CPC .... B60W 40/08; B60W 40/105; B60W 50/14; B60W 2050/146; B60W 2540/22; G06V 40/174
See application file for complete search history.

(56) References Cited

U.S. PATENT DOCUMENTS 10,322,728 B1 * 6/2019 Porikli ................. G06V 10/764
10,414,407 B1 9/2019 Slusar
(Continued)

FOREIGN PATENT DOCUMENTS

| EP | 2471694 A2 | 7/2012 |
| JP | 2006205773 A | 8/2006 |

(Continued)

OTHER PUBLICATIONS

European Search Report issued on Jul. 24, 2023 for application No. EP20927720.1.

(Continued)

*Primary Examiner* — Ramon A. Mercado
*Assistant Examiner* — Mohamad O El Sayah
(74) *Attorney, Agent, or Firm* — Nath, Goldberg & Meyer; Jerald L. Meyer; Stanley N. Protigal

(57) ABSTRACT

A travel information sensor senses travel information of a host-vehicle. A biological information sensor senses biological information of a driver. A camera unit senses a facial expression of the driver. A communication unit acquires an agitating degree indicating a degree to which an other-vehicle agitates the driver of the host-vehicle, via a network. An agitated degree calculation unit calculates an agitated degree indicating a degree to which the driver of the host-vehicle is agitated by the other-vehicle. A danger degree determination unit determines a danger degree including whether the driver of the host-vehicle is agitated by the other-vehicle, based on the agitated degree and the (Continued)

agitating degree. A presentation unit warns the host-vehicle of the danger degree if it is determined that the driver of the host-vehicle is agitated by the other-vehicle.

5 Claims, 16 Drawing Sheets

(51) Int. Cl.
 *B60W 50/14* (2020.01)
 *G06V 40/16* (2022.01)
(52) U.S. Cl.
 CPC ..... *G06V 40/174* (2022.01); *B60W 2050/146* (2013.01); *B60W 2540/22* (2013.01)

(56) References Cited

U.S. PATENT DOCUMENTS

| | | | | |
|---|---|---|---|---|
| 11,076,274 | B1* | 7/2021 | Buentello | H04W 4/40 |
| 2013/0307771 | A1* | 11/2013 | Parker | G06F 3/167 |
| | | | | 345/158 |
| 2016/0272199 | A1* | 9/2016 | Kawahara | B60W 50/14 |
| 2017/0325732 | A1* | 11/2017 | Kodama | A61B 5/18 |
| 2019/0185014 | A1* | 6/2019 | Choo | B60W 40/09 |
| 2020/0066146 | A1* | 2/2020 | Ichikawa | G06V 20/54 |
| 2020/0079368 | A1* | 3/2020 | Yamada | G08G 1/166 |
| 2020/0135023 | A1* | 4/2020 | Wang | B60Q 5/005 |
| 2020/0226355 | A1* | 7/2020 | el Kaliouby | A61B 5/18 |
| 2020/0239003 | A1* | 7/2020 | Sobhany | B60N 2/0026 |
| 2020/0269849 | A1* | 8/2020 | Kang | G06V 20/597 |
| 2021/0166560 | A1* | 6/2021 | Singh | G08G 1/0112 |
| 2022/0020270 | A1* | 1/2022 | Ogata | G08G 1/0141 |

FOREIGN PATENT DOCUMENTS

| | | |
|---|---|---|
| JP | 2008-70965 A | 3/2008 |
| JP | 2019199176 A | 11/2019 |
| JP | 2020024580 A | 2/2020 |

OTHER PUBLICATIONS

Office Action issued on Jan. 16, 2024 in the counterpart Japanese application No. 2020-052863.
Office Action issued on Jan. 16, 2024 in the counterpart Japanese application No. 2020-052864.

\* cited by examiner

FIG. 5A

AGITATED DEGREE CORRESPONDENCE TABLE Tb1
(BIOLOGICAL INFORMATION TABLE)

| SCORE | 0 | 1 | 2 | 3 | 4 | 5 | COEFFICIENT |
|---|---|---|---|---|---|---|---|
| HEART RATE [TIMES/MINUTE] | LESS THAN 75 | 75~80 | 80~85 | 85~90 | 90~95 | 95 OR MORE | 2 |
| BREATHING RATE [TIMES/MINUTE] | LESS THAN 20 | 20~25 | 25~30 | 30~35 | 35~40 | 40 OR MORE | 1.5 |
| BLOOD PRESSURE (UPPER SIDE) [mmHg] | LESS THAN 145 | 145~150 | 150~155 | 155~160 | 160~165 | 165 OR MORE | 2 |
| CONFIDENCE LEVEL [%] OF FACIAL EXPRESSION(ANGER, SADNESS, OR FATIGUE) | LESS THAN 40 | 40~50 | 50~60 | 60~70 | 70~80 | 80 OR MORE | 1.5 |

FIG. 5B (a) AGITATED DEGREE CORRESPONDENCE TABLE Tb1
(VEHICLE INFORMATION TABLE)

| SCORE | 0 | 1 | 2 | 3 | 4 | 5 | COEFFICIENT |
|---|---|---|---|---|---|---|---|
| SPEED[km/h] | 40~60 | 60~70 | 70~80 | 80 OR MORE | 30~40 | 30 OR LESS | 1.5 |
| NUMBER OF SUDDEN ACCELERATIONS [TIMES/10 SECONDS] | 0 | 1 | 2 | 3 | 4 | 5 OR MORE | 2 |
| DEGREE OF ACCELERATION (CHANGE AMOUNT PER SECOND[%]) | LESS THAN 5 | 5~10 | 10~15 | 15~20 | 20~25 | 25 OR MORE | 1.5 |
| FREQUENCY OF INATTENTIVE DRIVING [%] | 0~10 | 10~20 | 20~30 | 30~40 | 40~50 | 50 OR MORE | 1.5 |
| NUMBER OF SUDDEN STEERING MOVEMENTS [TIMES/MINUTE] | 0 | 1 | 2 | 3 | 4 | 5 OR MORE | 2 |

(b)

| MULTIPLICATION COEFFICIENT | 1 | 1.1 | 1.2 | 1.3 | 1.4 | 1.5 | 2.25 |
|---|---|---|---|---|---|---|---|
| VEHICLE TYPE INFORMATION(α) | A | B | C | D | E | F | |
| LANE INFORMATION(γ) | TRAVELING LANE | | | | | | PASSING LANE |

FIG. 6A

AGITATING DEGREE CORRESPONDENCE TABLE Tb2
(BIOLOGICAL INFORMATION TABLE)

| SCORE | 0 | 1 | 2 | 3 | 4 | 5 | COEFFICIENT |
|---|---|---|---|---|---|---|---|
| HEART RATE [TIMES/MINUTE] | LESS THAN 75 | 75~80 | 80~85 | 85~90 | 90~95 | 95 OR MORE | 2 |
| BREATHING RATE [TIMES/MINUTE] | LESS THAN 20 | 20~25 | 25~30 | 30~35 | 35~40 | 40 OR MORE | 1.5 |
| BLOOD PRESSURE (UPPER SIDE)[mmHg] | LESS THAN 145 | 145~150 | 150~155 | 155~160 | 160~165 | 165 OR MORE | 2 |
| CONFIDENCE LEVEL [%] OF FACIAL EXPRESSION (ANGER) | LESS THAN 40 | 40~50 | 50~60 | 60~70 | 70~80 | 80 OR MORE | 1.5 |

FIG. 6B

AGITATING DEGREE CORRESPONDENCE TABLE Tb2
(VEHICLE INFORMATION TABLE)

(a)

| SCORE | 0 | 1 | 2 | 3 | 4 | 5 | COEFFICIENT |
|---|---|---|---|---|---|---|---|
| SPEED [km/h] | LESS THAN 60 | 60~70 | 70~80 | 80~90 | 90~100 | 100 OR MORE | 1.5 |
| NUMBER OF SUDDEN ACCELERATIONS [TIMES/10 SECONDS] | 0 | 1 | 2 | 3 | 4 | 5 OR MORE | 2 |
| DEGREE OF ACCELERATION (CHANGE AMOUNT PER SECOND) [%] | LESS THAN 5 | 5~10 | 10~15 | 15~20 | 20~25 | 25 OR MORE | 1.5 |
| FREQUENCY OF INATTENTIVE DRIVING [%] | 0~10 | 10~20 | 20~30 | 30~40 | 40~50 | 50 OR MORE | 1.5 |
| NUMBER OF SUDDEN STEERING MOVEMENTS [TIMES/MINUTE] | 0 | 1 | 2 | 3 | 4 | 5 OR MORE | 2 |

(b)

| MULTIPLICATION COEFFICIENT | 1 | 1.1 | 1.2 | 1.3 | 1.4 | 1.5 |
|---|---|---|---|---|---|---|
| VEHICLE TYPE INFORMATION ($\alpha$) | A | B | C | D | E | F |
| VEHICLE BODY INFORMATION ($\beta$) | A | B | C | C | E | F |
| LANE INFORMATION ($\gamma$) | TRAVELING LANE | | | | | PASSING LANE |

FIG. 7A

FIRST EVALUATION VALUE TABLE TB1

| AGITATED DEGREE Q1 | EVALUATION VALUE Xp |
|---|---|
| 0~50 | X0 |
| 50~100 | X1 |
| 100~150 | X2 |
| 150 OR MORE | X3 |

FIG. 7B

SECOND EVALUATION VALUE TABLE TB2

| AGITATING DEGREE Q2 | EVALUATION VALUE Yp |
|---|---|
| 0~50 | Y0 |
| 50~100 | Y1 |
| 100~150 | Y2 |
| 150 OR MORE | Y3 |

FIG. 8A

WARNING FOR AGITATED VEHICLE

| WARNING CONTENT | EVALUATION VALUE Xp |
|---|---|
| NO WARNING | X0 |
| PLEASE DRIVE SAFELY | X1 |
| PLEASE TRAVEL CAREFULLY | X2 |
| DANGEROUS DRIVING HAS BEEN DETECTED. PLEASE PAY ATTENTION TO SURROUNDING VEHICLES. | X3 |

FIG. 8B

WARNING FOR AGITATING VEHICLE

| WARNING CONTENT | EVALUATION VALUE Yp |
|---|---|
| NO WARNING | Y0 |
| PLEASE DRIVE SAFELY | Y1 |
| PLEASE TRAVEL CAREFULLY | Y2 |
| DANGEROUS DRIVING HAS BEEN DETECTED. PLEASE ADOPT SAFE INTER-VEHICLE DISTANCE | Y3 |

DANGEROUS DRIVING WARNING DEVICE, DANGEROUS DRIVING WARNING SYSTEM, AND DANGEROUS DRIVING WARNING METHOD

CROSS REFERENCE TO RELATED APPLICATION

This application is a Continuation of PCT Application No. PCT/JP2020/044274 filed on Nov. 27, 2020, and claims the priority of Japanese Patent Application No. 2020-052863 filed on Mar. 24, 2020, Japanese Patent Application No. 2020-052864 filed on Mar. 24, 2020, and Japanese Patent Application No. 2020-052866 filed on Mar. 24, 2020, the entire contents of all of which are incorporated herein by reference.

BACKGROUND

The present disclosure relates to a dangerous driving warning device, a dangerous driving warning system, and a dangerous driving warning method.

When a driver is driving a host-vehicle, other vehicles travelling in the vicinity of the host-vehicle performing a dangerous action (hereinafter referred to as an "agitation action") against the host-vehicle such as sudden cutting off, sudden deceleration, and abnormal approaches has become a social problem. In order to ensure safe driving of the host-vehicle, it is desirable to promptly notify the driver of the host-vehicle that such an agitation action is being performed against the host-vehicle. Meanwhile, the driver of the host-vehicle may perform an agitation action against other vehicles unconsciously or due to a heightened emotion. Also in this kind of case, it is desirable to warn the driver of the host-vehicle that the host-vehicle is performing an agitation action.

As an invention related to such a technique, Japanese Unexamined Patent Application Publication No. 2008-70965 (Patent Literature 1) discloses a technique for comprehensively judging the mental state of a driver and performing vehicle control based on the judgment result. However, the technique disclosed in Patent Literature 1 does not warn that a host-vehicle or another vehicle is performing an agitation action.

SUMMARY

As described above, although Patent Literature 1 discloses that the mental state of the driver is comprehensively judged for the vehicle control to be performed, Patent Literature 1 does not disclose that a host-vehicle is warned of information that the host-vehicle or another vehicle is performing an agitation action.

A first embodiment provides a dangerous driving warning device that warns a host-vehicle that the host-vehicle is agitated by an other-vehicle, the dangerous driving warning device including: a host-vehicle information acquisition unit configured to acquire host-vehicle information including at least one of travel information of the host-vehicle, biological information of a driver of the host-vehicle, and a facial expression of the driver of the host-vehicle; a communication unit configured to acquire an agitating degree indicating a degree to which the other-vehicle is agitating the host-vehicle by means of radio communication; an agitated degree calculation unit configured to calculate an agitated degree indicating a degree to which the host-vehicle is agitated by the other-vehicle based on the host-vehicle information; a danger degree determination unit configured to determine a danger degree including whether the host-vehicle is agitated by the other-vehicle based on the agitated degree and the agitating degree; and a presentation unit configured to warn the host-vehicle of the danger degree if the danger degree determination unit determines that the host-vehicle is agitated.

Another embodiment provides a dangerous driving warning device that warns a host-vehicle that the host-vehicle is agitated by an other-vehicle; the dangerous driving warning device including: a host-vehicle information acquisition unit configured to acquire host-vehicle information including at least one of travel information of the host-vehicle, biological information of a driver of the host-vehicle, and a facial expression of the driver of the host-vehicle; a communication unit configured to acquire other-vehicle information including at least one of travel information of the other-vehicle, biological information of a driver of the other-vehicle, and a facial expression of the driver of the other-vehicle by means of radio communication; an agitated degree calculation unit configured to calculate an agitated degree indicating a degree to which the host-vehicle is agitated by the other-vehicle based on the host-vehicle information; an agitating degree calculation unit configured to calculate an agitating degree indicating a degree to which the other-vehicle agitates the host-vehicle based on the other-vehicle information; a danger degree determination unit configured to determine a danger degree including whether the host-vehicle is agitated by the other-vehicle based on the agitated degree and the agitating degree; and a presentation unit configured to warn the host-vehicle of the danger degree if the danger degree determination unit determines that the host-vehicle is agitated.

Another embodiment provides a dangerous driving warning system that warns a vehicle that a host-vehicle is agitated by an other-vehicle, the dangerous driving warning system including: a host-vehicle device mounted on the host-vehicle; an other-vehicle device mounted on the other-vehicle; and a server connected to the host-vehicle device and the other-vehicle device via a network, in which the host-vehicle device includes: a host-vehicle information acquisition unit configured to acquire host-vehicle information including at least one of travel information of the host-vehicle, biological information of a driver of the host-vehicle, and a facial expression of the driver of the host-vehicle; and a host-vehicle side communication unit configured to communicate with the server via the network, in which at least one of the host-vehicle device and the server includes: an agitated degree calculation unit configured to calculate an agitated degree indicating a degree to which the host-vehicle is agitated by the other-vehicle based on the host-vehicle information, in which the other-vehicle device includes: an other-vehicle information acquisition unit configured to acquire other-vehicle information including at least one of travel information of the other-vehicle, biological information of a driver of the other-vehicle, and a facial expression of the driver of the other-vehicle; and an other-vehicle side communication unit configured to communicate with the host-vehicle device via the network, in which at least one of the other-vehicle device and the server includes: an agitating degree calculation unit configured to calculate an agitating degree indicating a degree to which the other-vehicle agitates the host-vehicle based on the other-vehicle information, and in which the host-vehicle device further includes: a danger degree determination unit configured to determine a danger degree including whether the host-vehicle is agitated by the other-vehicle based on the agitated degree and the agitating degree; and a presentation unit configured to warn at least one of the host-vehicle and the other-vehicle of the danger degree if the danger degree determination unit determines that the host-vehicle is agitated.

Another embodiment provides a dangerous driving warning method of warning a vehicle that a host-vehicle is agitated by an other-vehicle, the dangerous driving warning method including the steps of: acquiring host-vehicle information including at least one of travel information of the host-vehicle, biological information of a driver of the host-vehicle, and a facial expression of the driver of the host-vehicle; calculating an agitated degree indicating a degree to which the host-vehicle is agitated by the other-vehicle based on the host-vehicle information; acquiring other-vehicle information including at least one of travel information of the other-vehicle, biological information of a driver of the other-vehicle, and a facial expression of the driver of the other-vehicle; calculating an agitating degree indicating a degree to which the other-vehicle agitates the host-vehicle based on the other-vehicle information; determining a danger degree including whether the host-vehicle is agitated by the other-vehicle based on the agitated degree and the agitating degree; and warning at least one of the host-vehicle and the other-vehicle of the danger degree if it is determined that the host-vehicle is agitated by the other-vehicle.

Another embodiment provides a dangerous driving warning device that warns a host-vehicle that the host-vehicle is agitating an other-vehicle, the dangerous driving warning device including: a host-vehicle information acquisition unit configured to acquire host-vehicle information including at least one of travel information of the host-vehicle, biological information of a driver of the host-vehicle, and a facial expression of the driver of the host-vehicle; a communication unit configured to acquire an agitated degree indicating a degree to which the other-vehicle is agitated by the host-vehicle by means of radio communication; an agitating degree calculation unit configured to calculate an agitating degree indicating a degree to which the host-vehicle agitates the other-vehicle based on the host-vehicle information; a danger degree determination unit configured to determine a danger degree including whether the host-vehicle agitates the other-vehicle based on the agitated degree and the agitating degree; and a presentation unit configured to warn the host-vehicle of the danger degree if the danger degree determination unit determines that the host-vehicle agitates the other-vehicle.

Another embodiment provides a dangerous driving warning device that warns a host-vehicle that the host-vehicle agitates an other-vehicle, the dangerous driving warning device including: a host-vehicle information acquisition unit configured to acquire host-vehicle information including at least one of travel information of the host-vehicle, biological information of a driver of the host-vehicle, and a facial expression of the driver of the host-vehicle; a communication unit configured to acquire other-vehicle information including at least one of travel information of the other-vehicle, biological information of a driver of the other-vehicle, and a facial expression of the driver of the other-vehicle by means of radio communication; an agitating degree calculation unit configured to calculate an agitating degree indicating a degree to which the host-vehicle agitates the other-vehicle based on the host-vehicle information; an agitated degree calculation unit configured to calculate an agitated degree indicating a degree to which the other-vehicle is agitated by the host-vehicle based on the other-vehicle information; a danger degree determination unit configured to determine a danger degree including whether the host-vehicle agitates the other-vehicle based on the agitated degree and the agitating degree; and a presentation unit configured to warn the host-vehicle of the danger degree if the danger degree determination unit determines that the host-vehicle agitates the other-vehicle.

Another embodiment provides a dangerous driving warning system that warns a vehicle of information that a host-vehicle agitates an other-vehicle, the dangerous driving warning system including: a host-vehicle device mounted on the host-vehicle; an other-vehicle device mounted on the other-vehicle; and a server connected to the host-vehicle device and the other-vehicle device via a network, in which the host-vehicle device includes: a host-vehicle information acquisition unit configured to acquire host-vehicle information including at least one of travel information of the host-vehicle, biological information of a driver of the host-vehicle, and a facial expression of the driver of the host-vehicle; and a host-vehicle side communication unit configured to communicate with the server via the network, in which at least one of the host-vehicle device and the server includes: an agitating degree calculation unit configured to calculate an agitating degree indicating a degree to which the host-vehicle agitates the other-vehicle based on the host-vehicle information, in which the other-vehicle device includes: an other-vehicle information acquisition unit configured to acquire other-vehicle information including at least one of travel information of the other-vehicle, biological information of a driver of the other-vehicle, and a facial expression of the driver of the other-vehicle; and an other-vehicle side communication unit configured to communicate with the host-vehicle device via the network, in which at least one of the other-vehicle device and the server includes: an agitated degree calculation unit configured to calculate an agitated degree indicating a degree to which the other-vehicle is agitated by the host-vehicle based on the other-vehicle information, and in which the host-vehicle device further includes: a danger degree determination unit configured to determine a danger degree including whether the host-vehicle agitates the other-vehicle based on the agitating degree and the agitated degree; and a presentation unit configured to warn at least one of the host-vehicle and the other-vehicle of the danger degree if the danger degree determination unit determines that the host-vehicle agitates the other-vehicle.

Another embodiment provides a dangerous driving warning method of warning a vehicle that a host-vehicle agitates an other-vehicle, the dangerous driving warning method including the steps of: acquiring, by means of the host-vehicle, host-vehicle information including at least one of travel information of the host-vehicle, biological information of a driver of the host-vehicle, and a facial expression of the driver of the host-vehicle; calculating an agitating degree indicating a degree to which the host-vehicle agitates the other-vehicle based on the host-vehicle information; acquiring other-vehicle information including at least one of travel information of the other-vehicle, biological information of a driver of the other-vehicle, and a facial expression of the driver of the other-vehicle; calculating an agitated degree indicating a degree to which the other-vehicle is agitated by the host-vehicle based on the other-vehicle information; determining a danger degree including whether the host-vehicle agitates the other-vehicle based on the agitating degree and the agitated degree; and warning at least one of the host-vehicle and the other-vehicle of the danger degree if it is determined that the host-vehicle agitates the other-vehicle.

Another embodiment provides a dangerous driving warning device that warns a host-vehicle that the host-vehicle agitates an other-vehicle, the dangerous driving warning device including: a host-vehicle information acquisition unit configured to acquire host-vehicle information including at least one of travel information of the host-vehicle, biological information of a driver of the host-vehicle, and a facial expression of the driver of the host-vehicle; a first agitating degree calculation unit configured to calculate a first agitating degree indicating a degree to which the host-vehicle agitates the other-vehicle based on the host-vehicle information; a communication unit configured to acquire a second agitating degree indicating a degree to which the other-vehicle agitates the host-vehicle by means of radio communication; a danger degree determination unit configured to determine a danger degree including whether the host-vehicle agitates the other-vehicle based on the first agitating degree and the second agitating degree; and a presentation unit configured to warn the host-vehicle of the danger degree if the danger degree determination unit determines that the host-vehicle agitates the other-vehicle.

Another embodiment provides a dangerous driving warning device that warns a host-vehicle that the host-vehicle agitates an other-vehicle, the dangerous driving warning device including: a host-vehicle information acquisition unit configured to acquire host-vehicle information including at least one of travel information of the host-vehicle, biological information of a driver of the host-vehicle, and a facial expression of the driver of the host-vehicle; a communication unit configured to acquire other-vehicle information including at least one of travel information of the other-vehicle, biological information of a driver of the other-vehicle, and a facial expression of the driver of the other-vehicle by means of radio communication; an agitating degree calculation unit configured to calculate a first agitating degree indicating a degree to which the host-vehicle agitates the other-vehicle based on the host-vehicle information and calculates a second agitating degree indicating a degree to which the other-vehicle agitates the host-vehicle based on the other-vehicle information; a danger degree determination unit configured to determine a danger degree including whether the host-vehicle agitates the other-vehicle based on the first agitating degree and the second agitating degree; and a presentation unit configured to warn the host-vehicle of the danger degree if the danger degree determination unit determines that the host-vehicle agitates the other-vehicle.

Another embodiment provides a dangerous driving warning system that warns a vehicle of information that a host-vehicle and an other-vehicle agitate each other, the dangerous driving warning system including: a host-vehicle device mounted on the host-vehicle; an other-vehicle device mounted on the other-vehicle; and a server connected to the host-vehicle device and the other-vehicle device via a network, in which the host-vehicle device includes: a host-vehicle information acquisition unit configured to acquire host-vehicle information including at least one of travel information of the host-vehicle, biological information of a driver of the host-vehicle, and a facial expression of the driver of the host-vehicle; and a host-vehicle side communication unit configured to communicate with the server via the network, in which at least one of the host-vehicle device and the server includes: a first agitating degree calculation unit configured to calculate a first agitating degree indicating a degree to which the host-vehicle agitates the other-vehicle based on the host-vehicle information, in which the other-vehicle device includes: an other-vehicle information acquisition unit configured to acquire other-vehicle information including at least one of travel information of the other-vehicle, biological information of a driver of the other-vehicle, and a facial expression of the driver of the other-vehicle; and an other-vehicle side communication unit configured to communicate with the host-vehicle device via the network, in which at least one of the other-vehicle device and the server includes: a second agitating degree calculation unit configured to calculate a second agitating degree indicating a degree to which the other-vehicle agitates the host-vehicle based on the other-vehicle information, and in which the host-vehicle device further includes: a danger degree determination unit configured to determine a danger degree including whether the host-vehicle and the other-vehicle agitate each other based on the first agitating degree and the second agitating degree; and a presentation unit configured to warn at least one of the host-vehicle and the other-vehicle of the danger degree if the danger degree determination unit determines that the host-vehicle and the other-vehicle agitate each other.

Another embodiment provides a dangerous driving warning method of warning a vehicle that a host-vehicle and an other-vehicle agitate each other, the dangerous driving warning method including the steps of: acquiring host-vehicle information including at least one of travel information of the host-vehicle, biological information of a driver of the host-vehicle, and a facial expression of the driver of the host-vehicle; calculating a first agitating degree indicating a degree to which the host-vehicle agitates the other-vehicle based on the host-vehicle information; acquiring other-vehicle information including at least one of travel information of the other-vehicle, biological information of a driver of the other-vehicle, and a facial expression of the driver of the other-vehicle; calculating a second agitating degree indicating a degree to which the other-vehicle agitates the host-vehicle based on the other-vehicle information; determining a danger degree including whether the host-vehicle and the other-vehicle agitate each other based on the first agitating degree and the second agitating degree; and warning at least one of the host-vehicle and the other-vehicle of the danger degree if it is determined that the host-vehicle and the other-vehicle agitate each other.

BRIEF DESCRIPTION OF THE DRAWINGS

FIG. 5A is a diagram illustrating a biological information table set in an agitated degree correspondence table Tb1.

FIG. 5B is a diagram illustrating a vehicle information table set in an agitated degree correspondence table Tb1.

FIG. 6A is a diagram illustrating a biological information table set in an agitating degree correspondence table Tb2.

FIG. 6B is a diagram illustrating a vehicle information table set in an agitating degree correspondence table Tb2.

FIG. 7A is a diagram illustrating a first evaluation value table showing the relationship between agitated degrees and evaluation values.

FIG. 7B is a diagram illustrating a second evaluation value table showing the relationship between agitating degrees and evaluation values.

FIG. 8A is a diagram illustrating the correspondence relationship between the warning content given to a vehicle receiving an agitation action and evaluation values.

FIG. 8B is a diagram illustrating the correspondence relationship between the warning content given to a vehicle performing an agitation action and evaluation values.

DETAILED DESCRIPTION

Embodiments will be described below with reference to the drawings.

Description of a First Embodiment

Figure 1:
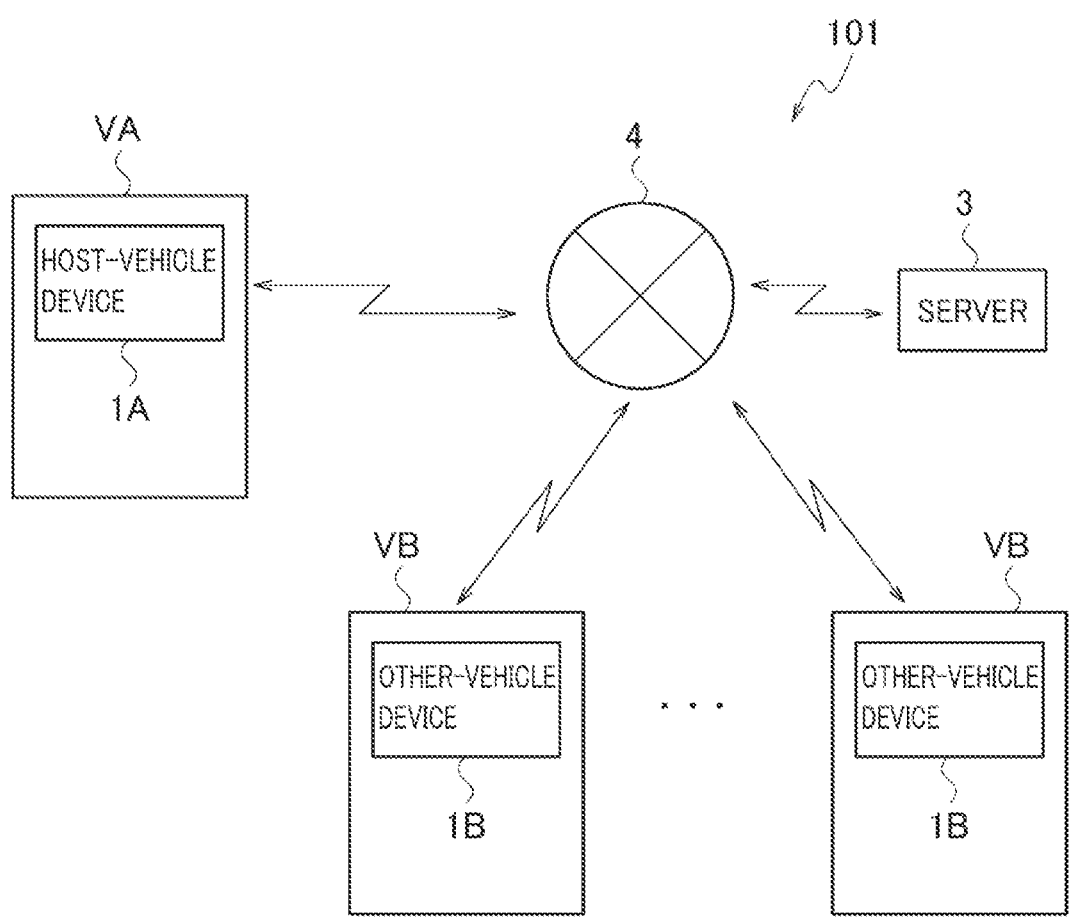
FIG. 1 is a block diagram illustrating a configuration of a dangerous driving warning system according to an embodiment.

FIG. 1 is a block diagram showing a configuration of a dangerous driving warning system according to an embodiment. A dangerous driving warning system 101 according to an embodiment warns a vehicle that a driver of a travelling host-vehicle VA is agitated by other-vehicles VB or that drivers of the other-vehicles VB are agitated by the travelling host-vehicle VA as shown in FIG. 1. The dangerous driving warning system 101 has a host-vehicle device 1A (a dangerous driving warning device) mounted on the host-vehicle VA, other-vehicle devices 1B mounted on one or a plurality of other-vehicles VB traveling around the front, rear, left and right sides of the host-vehicle VA, and a server 3 connected via a network 4 between the host-vehicle device 1A and the other-vehicle devices 1B. The host-vehicle device 1A and the other-vehicle devices 1B are connected by means of radio communication via the server 3.

Figure 2:
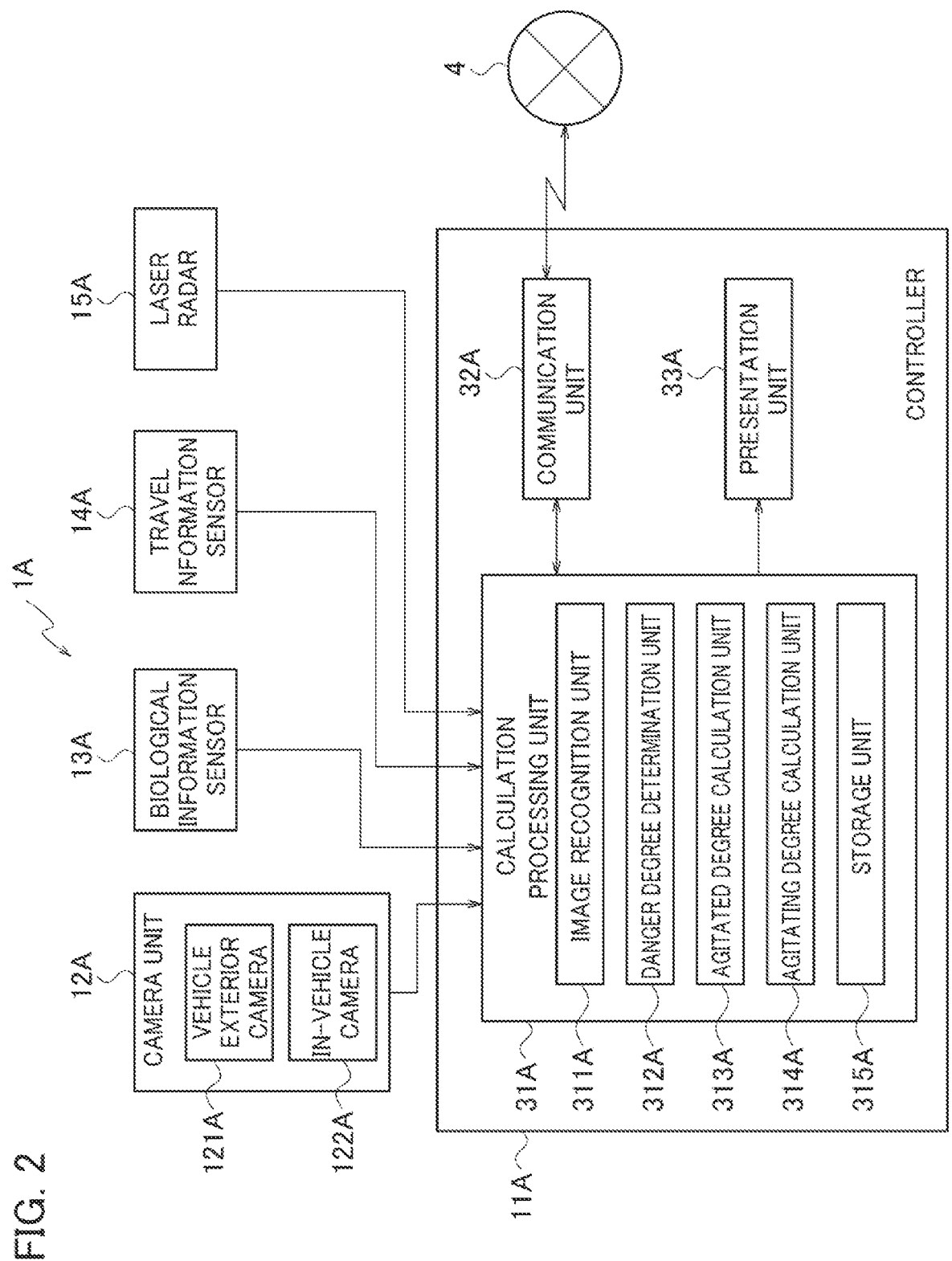
FIG. 2 is a block diagram illustrating a detailed configuration of a host-vehicle device mounted in a dangerous driving warning system according to an embodiment.

FIG. 2 is a block diagram showing a detailed configuration of the host-vehicle device 1A. The configuration of the host-vehicle device 1A will be described below with reference to FIG. 2. The host-vehicle device 1A includes a controller 11A, a camera unit 12A, a biological information sensor 13A, a travel information sensor 14A, and laser radars 15A as shown in FIG. 2.

The camera unit 12A has vehicle exterior cameras 121A and an in-vehicle camera 122A. The vehicle exterior cameras 121A captures the surrounding image of the host-vehicle VA. The in-vehicle camera 122A captures the face image of the driver of the host-vehicle VA.

The vehicle exterior cameras 121A are installed at the front, rear, and left and right side portions of the host-vehicle VA, and captures the surrounding image of the host-vehicle VA, for example. The vehicle exterior cameras 121A transmits the captured image data to the controller 11A. An optical camera, charge-coupled device (CCD), complementary metal-oxide semiconductor (CMOS), and the like can be used as the vehicle exterior cameras 121A. If the host-vehicle VA is an automatic driving vehicle, the vehicle exterior cameras 121A may also be used as a camera for capturing a surrounding image used for automatic driving.

The in-vehicle camera 122A is installed at the upper part of the windshield of the host-vehicle VA or a position in the vicinity of the instrument panel, and captures the face image of the driver, for example. The in-vehicle camera 122A transmits the captured image data to the controller 11A. As the in-vehicle camera 122A, an optical camera, CCD, CMOS, or the like can be used.

The biological information sensor 13A detects various pieces of biological information of the driver of the host-vehicle. Specific examples of the biological information sensor 13A include a heart rate sensor for measuring the heart rate per unit time of the driver, a breathing rate sensor for measuring the breathing rate per unit time of the driver, and a blood pressure sensor for measuring the blood pressure of the driver. The pieces of information obtained by the measurement by the biological information sensor 13A, that is, the pieces of information on the heart rate, breathing rate, and blood pressure are transmitted to the controller 11A. The heart rate, breathing rate, and blood pressure are measured and detected without contact with the driver's body by using sensors embedded in the host-vehicle seat, for example.

The travel information sensor 14A is a speed sensor and an acceleration sensor mounted on the host-vehicle VA, and transmits information on the detected speed and acceleration to the controller 11A, for example. The travel information sensor 14A also acquires information on the travelling road and lane on which the host-vehicle VA travels from a GPS receiver mounted on the host-vehicle VA. Specifically, if the host-vehicle VA travels on a traveling road having two or more lanes, the sensor acquires information indicating whether the lane on which the host-vehicle VA travels is a traveling lane or a passing lane. The travel information sensor 14A transmits information on the lane on which the host-vehicle travels to the controller 11A.

The vehicle exterior cameras 121A, the in-vehicle camera 122A, the biological information sensor 13A, the travel information sensor 14A, and the laser radars 15A are an example of a host-vehicle information acquisition unit that acquires host-vehicle information.

The laser radars 15A are lidars (laser imaging detection and ranging) mounted on the front side and the rear side of the host-vehicle, for example. The laser radars 15A emit the lasers toward the front position and the rear positon of the host-vehicle VA. The laser radars 15A receive the lasers reflected by a front vehicle and a rear vehicle and measure the distance between the host-vehicle and a preceding vehicle and the distance between the host-vehicle and a following vehicle. The laser radars 15A transmit information on the detected inter-vehicle distance to the controller 11A.

The controller 11A includes a calculation processing unit 31A, a communication unit 32A (a host-vehicle side communication unit), and a presentation unit 33A. The controller 11A can be configured as an integrated computer including a central processing unit (CPU) and storage means such as an RAM, an ROM, and a hard disk, for example.

The calculation processing unit 31A includes an image recognition unit 311A, a danger degree determination unit 312A, an agitated degree calculation unit 313A, an agitating degree calculation unit 314A, and a storage unit 315A.

The image recognition unit 311A recognizes the operation of the other-vehicles VB presenting in the individual directions of the front side, rear side, right side, and left side of the host-vehicle VA based on the surrounding image of the host-vehicle VA captured by means of the vehicle exterior cameras 121A.

The image recognition unit 311A also acquires a face image of the driver captured by means of the in-vehicle camera 122A, analyzes the acquired face image, and detects the expression of the driver of the host-vehicle VA. Specifically, the image recognition unit 311A classifies driver's facial expressions into categories of anger, surprise, fear, sadness, fatigue, enjoyment, and hatred. A known technique can be employed for the method of analyzing the face image.

The storage unit 315A stores the above described expression of the driver, various kinds of pieces of biological information detected by means of the biological information sensor 13A, travel information (information on speed and acceleration) of a vehicle detected by means of the travel information sensor 14A, information on the traveling lane, and information on the inter-vehicle distance detected by mean of the laser radars 15A. Further, the storage unit 315A stores information on the vehicle type of the host-vehicle VA. The "vehicle type" is a concept that includes the classification of passenger vehicles and light vehicles, the classification of engine displacement, the classification of domestic and foreign vehicles, specific names of vehicle types, and specific vehicle numbers.

Further, the storage unit 315A stores an agitated degree correspondence table Tb1 for quantifying the degree to which the host-vehicle VA is agitated by the other-vehicles VB traveling around the host-vehicle VA. The quantification is performed based on the expression of the driver of the host-vehicle VA, the biological information of the driver, the travel information of the host-vehicle VA, the information on the traveling lane, the information on the inter-vehicle distance, and the information on a type of the host-vehicle VA.

The agitated degree correspondence table Tb1 is also used for quantifying the degree to which the other-vehicles VB are agitated by the host-vehicle VA. The quantification is performed based on the expressions of the drivers of the other-vehicles VB, the pieces of biological information of the drivers, the pieces of travel information on the other-vehicle VB, the pieces of information on the traveling lanes, the pieces of information on the inter-vehicle distances, and the pieces of information on types of the other-vehicles VB.

In addition, the storage unit 315A stores an agitating degree correspondence table Tb2 for quantifying the degree to which the host-vehicle VA agitates the driver of the other-vehicle VB. The quantification is performed based on the expression of the driver of the host-vehicle VA, the biological information of the driver, the travel information of the host-vehicle VA, the information on the traveling lane, the information on the inter-vehicle distance, and the information on a type of the host-vehicle VA.

The agitating degree correspondence table Tb2 is also used for quantifying the degree to which the other-vehicle VB agitates the driver of the host-vehicle VA. The quantification is performed based on the expressions of the drivers of the other-vehicles VB, the pieces of biological information of the drivers, the pieces of travel information on the other-vehicle VB, the pieces of information on the traveling lanes, the pieces of information on the inter-vehicle distances, and the pieces of information on types of the other-vehicles VB.

Details of the agitated degree correspondence table Tb1 and the agitating degree correspondence table Tb2 will be described later with reference to FIGS. 5A, 5B, 6A, and 6B.

The storage unit 315A also stores a first evaluation value table TB1 and a second evaluation value table TB2. In the first evaluation value table TB1, the degree to which the driver of the host-vehicle VA is agitated by the other-vehicles VB traveling around the host-vehicle VA (hereinafter referred to as an "agitated degree") is classified into four stages, and an evaluation value is set to each stage. In the second evaluation value table TB2, the degree to which the host-vehicle VA agitates the driver of the other-vehicle VB traveling around the host-vehicle VA (hereinafter referred to as an "agitating degree") is classified into four stages, and an evaluation value is set to each stage. Details of each of the evaluation value tables TB1 and TB2 will be described later with reference to FIGS. 7A and 7B.

The agitated degree calculation unit 313A calculates an agitated degree that is the degree to which the driver of the host-vehicle VA is agitated by the other-vehicles VB by referring to the agitated degree correspondence table Tb1 based on various kinds of pieces of biological information detected by means of the biological information sensor 13A of the host-vehicle device 1A, various kinds of pieces of vehicle information detected by means of the travel information sensor 14A, information on the traveling lane, and the inter-vehicle distance detected by means of the laser radars 15A.

The agitated degree calculation unit 313A also calculates an agitated degree that is the degree to which the drivers of the other-vehicles VB are agitated by the host-vehicle VA by referring to the agitated degree correspondence table Tb1 based on various kinds of pieces of biological information detected by means of biological information sensors 13B of other-vehicle devices 1B, various kinds of pieces of vehicle information detected by means of travel information sensors 14B, pieces of information on the traveling lanes, and the inter-vehicle distances detected by means of laser radars 15B.

The agitating degree calculation unit 314A calculates an agitating degree that is the degree to which the host-vehicle VA agitates the driver of the other-vehicle VB based on the biological information of the driver of the host-vehicle VA, the information on the host-vehicle VA, the information on the traveling lane, and the information on the inter-vehicle distance.

Further, if the agitating degree calculation unit 314A receives, from the other-vehicles VB, the pieces of biological information of the drivers of the other-vehicles VB, the pieces of information on the other-vehicles VB, the pieces of information on the traveling lanes, and the pieces of information on the inter-vehicle distances, the agitating degree calculation unit 314A calculates an agitating degree that is the degree to which the other-vehicles VB agitate the driver of the host-vehicle VA based on these pieces of information. The agitated degree, the agitating degree, and the calculation methods of these will be described later.

The danger degree determination unit 312A determines the degree to which the driver of the host-vehicle VA is agitated by the other-vehicle VB (a first evaluation value Xp described later) and the degree to which the host-vehicle VA agitates the driver of the other-vehicle VB (a second evaluation value Yp described later) based on the agitating degree and the agitated degree.

The communication unit 32A communicates with a server 3 via a network 4. Specifically, the communication unit 32A transmits, to the server 3, information on the expression of the driver of the host-vehicle VA recognized by means of the image recognition unit 311A, various kinds of pieces of biological information detected by means of the biological information sensor 13A, travel information on the host-vehicle VA detected by means of the travel information sensor 14A, information on the inter-vehicle distance detected by means of the laser radars 15A, and information on the traveling lane. The communication unit 32A also receives data transmitted from a communication unit 22 (described later) of the server 3.

Further, the communication unit 32A acquires the agitating degree indicating the degree to which the other-vehicle VB agitates the driver of the host-vehicle VA via the server 3 and the network 4.

The presentation unit 33A is a display mounted in a vehicle, for example. Suppose that the danger degree determination unit 312A determines that the driver of the host-vehicle VA is agitated by the other-vehicles VB, that the host-vehicle VA agitates the driver of the other-vehicle VB, or that the driver of the host-vehicle VA and the drivers of the other-vehicles VB are mutually agitated. In the above case, the presentation unit 33A displays an image indicating a warning. In addition to displaying an image, the presentation unit 33A can also notify a user of a warning by using voice, light, vibration, and the like.

That is, if the danger degree determination unit 312A determines that the driver of the host-vehicle VA is agitated by the other-vehicles VB, the presentation unit 33A warns the host-vehicle VA of the danger degree due to the agitation action received from the other-vehicles VB. Specifically, a warning is given to the host-vehicle by presenting a dangerous situation by using voice or text, such as "An agitation action is being received from a vehicle behind". Alternatively, a warning can be given to the host-vehicle by classifying the danger degree into numerical values of ten stages and the presenting in which stage, a current danger degree is in. Still alternatively, the host-vehicle is warned of the danger degree by continuously changing the display color between "blue" and "red".

Figure 3:
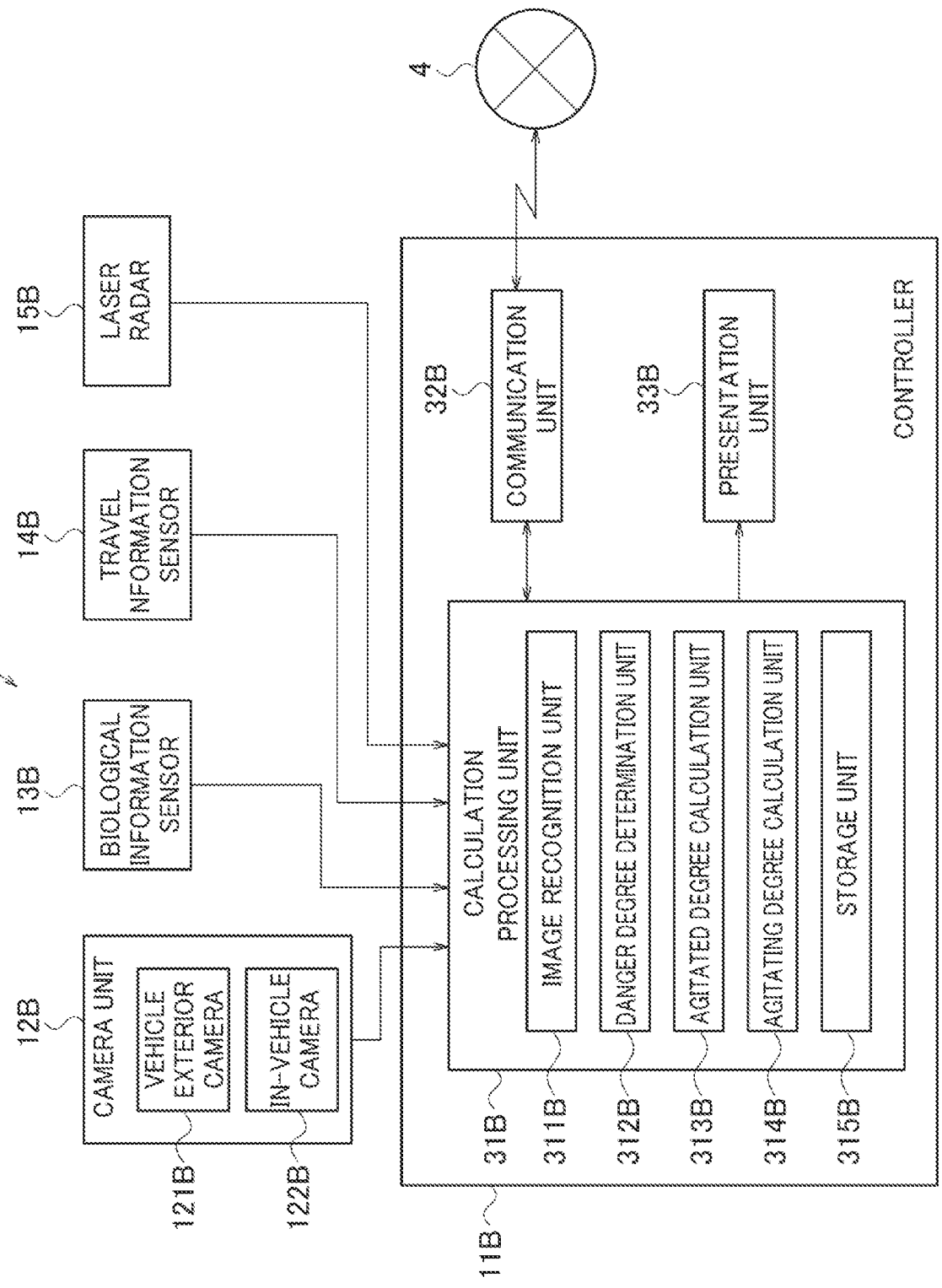
FIG. 3 is a block diagram illustrating a detailed configuration of an other-vehicle device mounted in a dangerous driving warning system according to an embodiment.

FIG. 3 is a block diagram showing a detailed configuration of an other-vehicle device 1B. The other-vehicle device 1B includes a controller 11B, a camera unit 12B having a vehicle exterior camera 121B and an in-vehicle camera 122B, a biological information sensor 13B, a travel information sensor 14B, and laser radars 15B as shown in FIG. 3. The controller 11B includes a calculation processing unit 31B, a communication unit 32B (other-vehicle side communication unit), and a presentation unit 33B.

The vehicle exterior camera 121B, the in-vehicle camera 122B, the biological information sensor 13B, the travel information sensor 14B, and the laser radars 15B are an example of an other-vehicle information acquisition unit for acquiring other-vehicle information.

The other-vehicle devices 1B has the same configuration as the host-vehicle device 1A described above. Therefore, the suffix "A" of each component of the host-vehicle device 1A is replaced with "B" for the description of the other-vehicle devices 1B, and a detailed description thereof is omitted.

Figure 4:
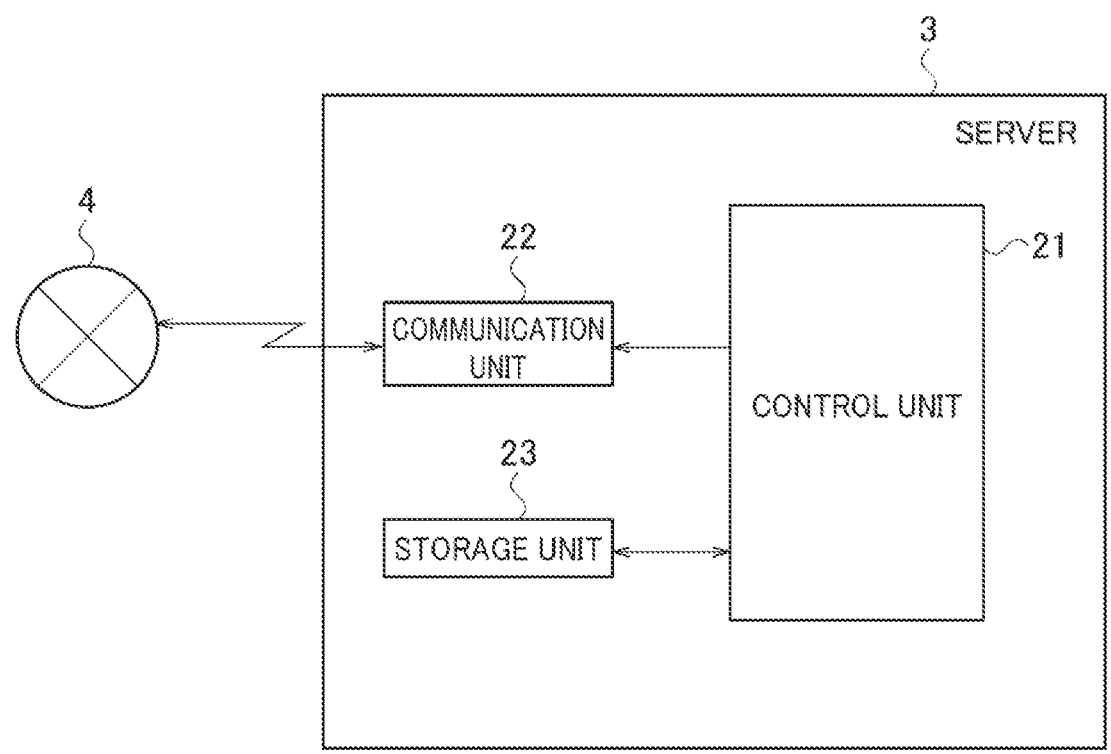
FIG. 4 is a block diagram illustrating a detailed configuration of a server installed in a dangerous driving warning system according to an embodiment.

FIG. 4 is a block diagram showing the configuration of the server 3 shown in FIG. 1. The server 3 includes a control unit 21, a communication unit 22, and a storage unit 23 as shown in FIG. 3.

The communication unit 22 is connected to the host-vehicle device 1A and at least one other-vehicle device 1B via the network 4. The communication unit 22 communicates with the host-vehicle device 1A and at least one other-vehicle device 1B via the network 4.

The storage unit 23 stores various kinds of pieces of data transmitted from the communication unit 32A of the host-vehicle device 1A and the communication unit 32B of the other-vehicle device 1B. Specifically, the storage unit 23 stores the expression of the driver, various kinds of pieces of biological information, travel information of the host-vehicle VA, information on the inter-vehicle distance, information on a type of the host-vehicle VA, and the like which are transmitted from the host-vehicle device 1A. Furthermore, the storage unit 23 stores the expression of the driver, various kinds of pieces of biological information, travel information of the other-vehicle VB, information on the inter-vehicle distance, information on type of the other-vehicle VB, and the like which are transmitted from the other-vehicle device 1B.

The control unit 21 receives various kinds of pieces of information transmitted from the host-vehicle device 1A and the other-vehicle device 1B. Further, the control unit 21 performs the control to transmit the received various kinds of pieces of information to the host-vehicle device 1A and the other-vehicle device 1B. In the second modified example of a first embodiment, the second modified example of a second embodiment, and the second modified example of a third embodiment, which will be described later, the control unit 21 performs the same processes as those of the danger degree determination unit 312A, the agitated degree calculation unit 313A, and the agitating degree calculation unit 314A described above.

The control unit 21 can be configured as an integrated computer including a central processing unit (CPU) and storage means such as an RAM, an ROM, and a hard disk, for example.

[Description of Agitated Degree Correspondence Table Tb1]

Next, with reference to FIGS. 5A and 5B, the agitated degree correspondence table Tb1 stored in the storage unit 315A will be described.

FIGS. 5A and 5B show the agitated degree correspondence table Tb1 used for quantifying the agitated degree that is the degree to which the driver of the host-vehicle VA (or the other-vehicle VB) is agitated by the other-vehicle VB (or the host-vehicle VA). FIG. 5A shows a biological information table in which numerical values based on the biological information of the driver are set. FIG. 5B shows a vehicle information table in which numerical values based on the information of the host-vehicle VA are set.

As shown in FIG. 5A, in the biological information table, a heart rate [times/minute], a breathing rate [times/minute], a blood pressure (upper side) [mmHg], and a confidence level [%] of a facial expression (anger, sadness, or fatigue), and a score and a coefficient of each numerical value are set. If the heart rate of the driver of the host-vehicle VA is in the range from 75 to 80 [times/minute], the score is "1" and the coefficient is "2", for example. If the breathing rate of the driver is 40 [times/minute] or more, the score is "5" and the coefficient is "1.5".

Meanwhile, as shown in FIG. 5B(a), in the vehicle information table, a speed of a host-vehicle [km/h], the number of sudden accelerations per unit time (in this case, 10 seconds), the degree of sudden accelerations (in this case, the change amount in speed per second [%]), the frequency of inattentive driving (in this case, the percentage of time in 1 minute during which the line of sight deviates 30 degrees or more from the front direction to an up-down direction and a right-left direction [%]), the number of sudden steering movements (in this case, the number of times per minute [times/minute]), and a score and a coefficient of each numerical value are set. If the speed is in the range from 40 to 60 [km/h], since the host-vehicle is considered to be traveling at a standard speed, the driver of the host-vehicle is less likely to be agitated by other-vehicles VB, and therefore the score is "0", for example.

When the speed is in the range from 30 to 40 [km/h], the score is "4" because the host-vehicle travels at the low speed and is likely to be agitated by other-vehicles, and the coefficient is set to 1.5. When the speed is 30 [km/h] or less, the score is "5" because the driver of the host-vehicle is more likely to be agitated by other-vehicles and the coefficient is set to 1.5.

Further, the higher the number of sudden accelerations per unit time (for example, 10 seconds), the higher the score is set. If the number of sudden accelerations is 5 times or more during 10 seconds, the score is set to "5" and the coefficient is set to "2", for example. In addition, the higher the frequency of inattentive driving, the higher the score. The higher the number of sudden steering movements, the higher the score.

As shown in FIG. 5B(b), in the vehicle information table, multiplication coefficients relative to information on a type of the host-vehicle VA are set in the range from "1" to "1.5". Further, the multiplication coefficient relative to information on the lane on which the host-vehicle is to travel is set to either "1" or "2.25". The multiplication coefficients are "a" and "y", which will be described later, and are coefficients used for calculating the agitated degree. Therefore, the larger the multiplication coefficient, the larger the value of the agitated degree.

The information on a type of the host-vehicle VA can be classified depending on the size of the engine displacement of the host-vehicle and depending on whether the host-vehicle is a domestic vehicle or a foreign vehicle as described above, for example. As an example, if the host-vehicle is a foreign vehicle and the engine displacement of the host-vehicle is 2000 [cc] or more, the category is "A". If the engine displacement is less than 2000 [cc], the category is "B". If the host-vehicle is a domestic vehicle and the engine displacement is 3000 [cc] or more, the category is "C", if the engine displacement is in the rage from 2000 to 3000 [cc], the category is "D", if the engine displacement is in the range from 1000 to 2000 [cc], the category is "E", and if the engine displacement is 1000 [cc] or less, the category is "F".

In other words, it is considered that a vehicle with a small engine displacement such as a light vehicle is likely to be agitated, and therefore the multiplication coefficient is set to be high. Alternatively, it is considered that a foreign vehicle with a large engine displacement is less likely to be agitated, and therefore the multiplication coefficient is set to be low.

The lane information indicates whether the host-vehicle VA is traveling on the traveling lane or on the passing lane. If the host-vehicle VA is continuously traveling on the traveling lane, the multiplication coefficient is set to "1". If the host-vehicle VA is traveling on the passing lane for 30 seconds or longer between the current time and the time backward by 5 minutes from the current time, the multiplication coefficient is "2.25", for example. That is, if the host-vehicle VA is traveling on the passing lane, the possibility that the driver of the host-vehicle is agitated by the other-vehicles VB increases, and therefore the multiplication coefficient is set to be high. If the host-vehicle VA travels on a single-lane road on either side, the multiplication coefficient is "1".

The scores, coefficients, and multiplication coefficients described above are used in an arithmetic expression (described later) for calculating the agitated degree and the agitating degree.

In the above description, the agitated degree correspondence table Tb1 stored in the storage unit 315A mounted on the host-vehicle device 1A has been described. However, the similar agitated degree correspondence table Tb1 is also stored in a storage unit 315B mounted on the other-vehicle device 1B.

[Description of Agitating Degree Correspondence Table Tb2]

Next, the agitating degree correspondence table Tb2 stored in the storage unit 315A will be described with reference to FIGS. 6A and 6B.

FIGS. 6A and 6B show an agitating degree correspondence table Tb2 used for quantifying an agitating degree that is the degree to which the host-vehicle VA (or other-vehicle VB) agitates the driver of the other-vehicle VB (or the host-vehicle VA). FIG. 6A shows a biological information table in which numerical values based on the biological information of the driver are set. FIG. 6B shows a vehicle information table in which numerical values based on the information on the host-vehicle are set.

As shown in FIG. 6A, in the biological information table, a heart rate [times/minute], a breathing rate [times/minute], a blood pressure (upper side) [mmHg], and a confidence level [=] of facial expression (anger), and a score and a coefficient of each numerical value are set. If the heart rate is in the range from 75 to 80 [times/minute], the score is "1" and the coefficient is "2", for example. Further, if the breathing rate is 40 [times/minute] or more, the score is "5" and the coefficient is "1.5".

Meanwhile, as shown in FIG. 6B(a), in the vehicle information table, a speed of a host-vehicle [km/h], the number of sudden accelerations per unit time (in this case, 10 seconds), the degree of sudden accelerations (in this case, the change amount in speed per second [%]), the frequency of inattentive driving (in this case, the percentage of time in 1 minute during which the line of sight deviates 30 degrees or more from the front direction to an up-down direction and a right-left direction [%]), and the number of sudden steering movements (in this case, the number of times per minute [times/minute]), and a score and a coefficient of each numerical value are set. If the speed is in the range from 60 to 70 [km/h], the score is "1" and the coefficient is "1.5", for example. If the number of sudden acceleration is 5 times or more times during 10 seconds, the score is set to "5" and the coefficient is set to "2".

Further, as shown in FIG. 6B(b), in the vehicle information table, the multiplication coefficients relative to the vehicle type information and the vehicle body information of the host-vehicle VA are set in the range from "1" to "1.5" individually. The information on a type of the host-vehicle VA can be classified depending on the size of the engine displacement of the host-vehicle and depending on whether the host-vehicle is a domestic vehicle or a foreign vehicle. As an example, if the host-vehicle is a domestic vehicle with the engine displacement of 1000 [cc] or less, the category is "A", if the engine displacement is in the range from 1000 to 2000 [cc], the category is "B", if the engine displacement is in the range from 2000 to 3000 [cc], the category is "C", and if the engine displacement is 3000 [cc] or more, the category is "D". Further, if the host-vehicle is a foreign vehicle with the engine displacement of 2000 [cc] or less, the category is "E", and if the engine displacement is 2000 [cc] or more, the category is "F".

That is, it is considered that a vehicle with a large engine displacement or a foreign vehicle is likely to perform an agitation action, and therefore, a multiplication coefficient is set to be high. Alternatively, it is considered that a domestic vehicle with a small engine displacement, such as a light vehicle is less likely to perform an agitation action, and therefore, a multiplication coefficient is set to be low.

The vehicle body information is information on violation history and accident history in the past. If the number of past violations and accidents is zero, the category is "A", and as the number of past violations and accidents increases, the category is changed to "B", "C", "D", "E", and "F" in this order. That is, it is considered that a vehicle that caused a large number of violations and accidents in the past is likely to agitate other-vehicles. Therefore, the higher the number of violations and accidents, the higher the multiplication coefficient is set. The multiplication coefficient is set to be high for a vehicle type that caused a large number of violations and accidents in the past, for example. In addition, the multiplication coefficient is set to be high for a vehicle of a vehicle number that caused a large number of violations and accidents in the past.

The lane information indicates whether the host-vehicle VA is traveling on the traveling lane or on the passing lane. The multiplication coefficient is set to "1" if the host-vehicle VA is continuously traveling on the traveling lane, for example. The multiplication coefficient is set to "1.5" if the host-vehicle VA is traveling on the passing lane for 30 seconds or longer between the current time and the time backward by 5 minutes from the current time. That is, if the host-vehicle VA is traveling on the passing lane, the possibility that the host-vehicle agitates the drivers of the other-vehicles VB increases, and therefore, the multiplication coefficient is set to be high. If the host-vehicle VA travels on a single-lane road on either side, the multiplication coefficient is "1". Further, the larger the number of other-vehicles travelling around the host-vehicle, the higher the multiplication coefficient may be set.

The scores, coefficients, and multiplication coefficients described above are used in an arithmetic expression (described later) for calculating the agitated degree and the agitating degree.

In the above description, the agitating degree correspondence table Tb2 stored in the storage unit 315A mounted on the host-vehicle device 1A has been described. However, the similar agitating degree correspondence table Tb2 is also stored in the storage unit 315B mounted on the other-vehicle device 1B.

In a first embodiment, the agitated degree correspondence table Tb1 shown in FIGS. 5A and 5B is used to calculate the agitated degree (this is referred to as "Q1") when the driver of the host-vehicle VA is agitated by the other-vehicle VB. Further, the agitating degree correspondence table Tb2 shown in FIGS. 6A and 6B is used to calculate the agitating degree (this is referred to as "Q2") when the other-vehicle VB agitates the driver of the host-vehicle VA. Based on the calculated agitated degree Q1 and the agitating degree Q2, an evaluation value of the danger degree due to the agitation action received by the host-vehicle VA from the other-vehicle VB is calculated and an evaluation value of the danger degree due to the agitation action performed by the other-vehicle VB against the host-vehicle VA is calculated. The warning in accordance with each evaluation value is presented to the driver of the host-vehicle VA. Details of the "evaluation value" will be described later.

Further, in a second embodiment, the agitated degree Q1 when the driver of the other-vehicle VB is agitated by the host-vehicle VA is calculated by using the agitated degree correspondence table Tb1. Further, the agitating degree Q2 when the host-vehicle VA agitates the driver of the other-vehicle VB is calculated by using the agitating degree correspondence table Tb2. Based on the calculated agitated degree Q1 and the agitating degree Q2, an evaluation value of the danger degree due to the agitation action received by the other-vehicle VB from the host-vehicle VA is calculated and an evaluation value of the danger degree due to the agitation action performed by the host-vehicle VA against the other-vehicle VB is calculated. The warning in accordance with each evaluation value is presented to the driver of the host-vehicle VA.

Further, in a third embodiment, the agitating degree correspondence table Tb2 is used to calculate the agitating degree Q2 (first agitating degree) when the host-vehicle VA agitates the driver of the other-vehicle VB and the agitating degree Q2' (second agitating degree) when the other-vehicle VB agitates the driver of the host-vehicle VA. Based on the calculated first agitating degree Q2 and second agitating degree Q2', an evaluation value of the danger degree due to the agitation action performed by the other-vehicle VB against the host-vehicle VA is calculated and an evaluation value of the danger degree due to the agitation action performed by the host-vehicle VA against the other-vehicle VB is calculated. The warning in accordance with each evaluation value is presented to the driver of the host-vehicle VA.

[Description of Calculation Method of Agitated Degree]

Next, a method will be described in which an agitated degree calculation unit 313A refers to the agitated degree correspondence table Tb1 described to calculate the agitated degree Q1 when the driver of the host-vehicle VA is agitated by the other-vehicle VB.

Based on various kinds of pieces of information detected by the host-vehicle device 1A, the agitated degree calculation unit 313A calculates a parameter q1 by using the following equation (1) based on a score and a coefficient of each item shown in FIGS. 5A and 5B.

$$q1=(\text{heart rate score})*2+(\text{breathing rate score})*1.5+\\(\text{blood pressure score})*2+(\text{facial expression score})*1.5+(\text{speed score})*1.5+(\text{score of number of sudden accelerations})*2+(\text{score of sudden acceleration degree})*1.5+(\text{frequency of inattentive driving})*1.5+(\text{number of sudden steering movements})*2 \qquad (1)$$

In Equation (1), if scores are all "5", which is the maximum value, q1=77.5 holds.

Further, the parameter q1 is multiplied by a multiplication coefficient in accordance with the information on a type of the host-vehicle VA (this is referred to as "α") and a score in accordance with the lane information (this is referred to as "γ") in the following equation (2), and thus the agitated degree Q1 is calculated. The α is a numerical value in the range from 1 to 1.5 and the γ is a numerical value of either one of 1 and 2.25.

$$Q1=\alpha*\gamma*q1 \qquad (2)$$

In the equation (2), the agitated degree Q1 takes a numerical value in the range from 0 to 261.6.

[Description of Calculation Method of Agitating Degree]

Next, a description will be given of a method in which an agitating degree calculation unit 314A refers to the agitating degree correspondence table Tb2 shown in FIGS. 6A and 6B to calculate the agitating degree Q2 when the host-vehicle VA agitates the driver of the other-vehicle VB.

Based on the expression of the driver of the host-vehicle VA, the biological information of the driver, and the driving information of the host-vehicle VA, the agitating degree calculation unit 314A calculates a parameter q2 by using the following equation (3) based on the scores and coefficients shown in FIGS. 6A and 6B.

$$q2=\text{(heart rate score)}*2+\text{(breathing rate score)}*1.5+\text{(blood pressure score)}*2+\text{(facial expression score)}*1.5+\text{(speed score)}*1.5+\text{(score of number of sudden accelerations)}*2+\text{(score of sudden acceleration degree)}*1.5+\text{(frequency of inattentive driving)}*1.5+\text{(number of sudden steering movements)}*2 \quad (3)$$

In equation (3), if the scores are all "5", which is the maximum value, q2=77.5 holds.

Further, the parameter q2 is multiplied by the score in accordance with the information on a type of the host-vehicle VA (this is referred to as "α"), the score in accordance with the vehicle body information (this is referred to as "β"), and the score in accordance with the lane information (this is referred to as "γ") in the following equation (4), and thus, the agitating degree Q2 is calculated. The α and β are numerical values in the range from 1 to 1.5 and γ is a numerical value of either one of 1 and 1.5.

$$Q2=\alpha*\beta*\gamma*q2 \quad (4)$$

In equation (4), the agitating degree Q2 is a numerical value in the range from 0 to 261.6.

[Description of Evaluation Value Table]

Next, an evaluation value table will be described. The storage unit 315A shown in FIG. 2 stores a first evaluation value table and a second evaluation value table. In the first evaluation value table, the agitated degree Q1 of an agitation action received by the host-vehicle VA from the other-vehicle VB is classified into four stages and an evaluation value is set for each stage. In the second evaluation value table, the agitated degree Q2 of an agitation action performed by the host-vehicle VA against the other-vehicle VB is classified into four stages and an evaluation value is set for each stage.

FIG. 7A shows a first evaluation value table TB1. As shown in FIG. 7A, in the first evaluation value table TB1, the relationship between the agitated degree Q1 which changes in the range from "0 to 202.5" and the evaluation value Xp is set. Specifically, the agitated degree Q1 is classified into four stages, and as evaluation values Xp for the four stages, X0 to X3 are set. If the agitated degree Q1 is in the range from 0 to 50, the evaluation value Xp is X0, for example.

FIG. 7B shows the second evaluation value table TB2. As shown in FIG. 7B, in the second evaluation value table TB2, the relationship between the agitating degree Q2 which changes in the range from "0 to 202.5" and the evaluation value Yp is set. Specifically, the agitating degree Q2 is classified into four stages, and as evaluation values Yp for the four stages, Y0 to Y3 are set. If the agitating degree Q2 is 150 or more, the evaluation value Yp is Y3, for example.

The danger degree determination unit 312A determines an evaluation value Xp (this is defined as a first evaluation value Xp) by referring to the first evaluation value table TB1 based on the agitated degree Q1. The danger degree determination unit 312A determines an evaluation value Yp (this is defined as a second evaluation value Yp) by referring to the second evaluation value table TB2 based on the agitating degree Q2.

The danger degree determination unit 312A determines the warning content given to the driver of the host-vehicle VA (see FIGS. 8A and 8B) based on the determined first evaluation value Xp and second evaluation value Yp and outputs the content to the presentation unit 33A.

Description of Operation of a First Embodiment

Figure 9:
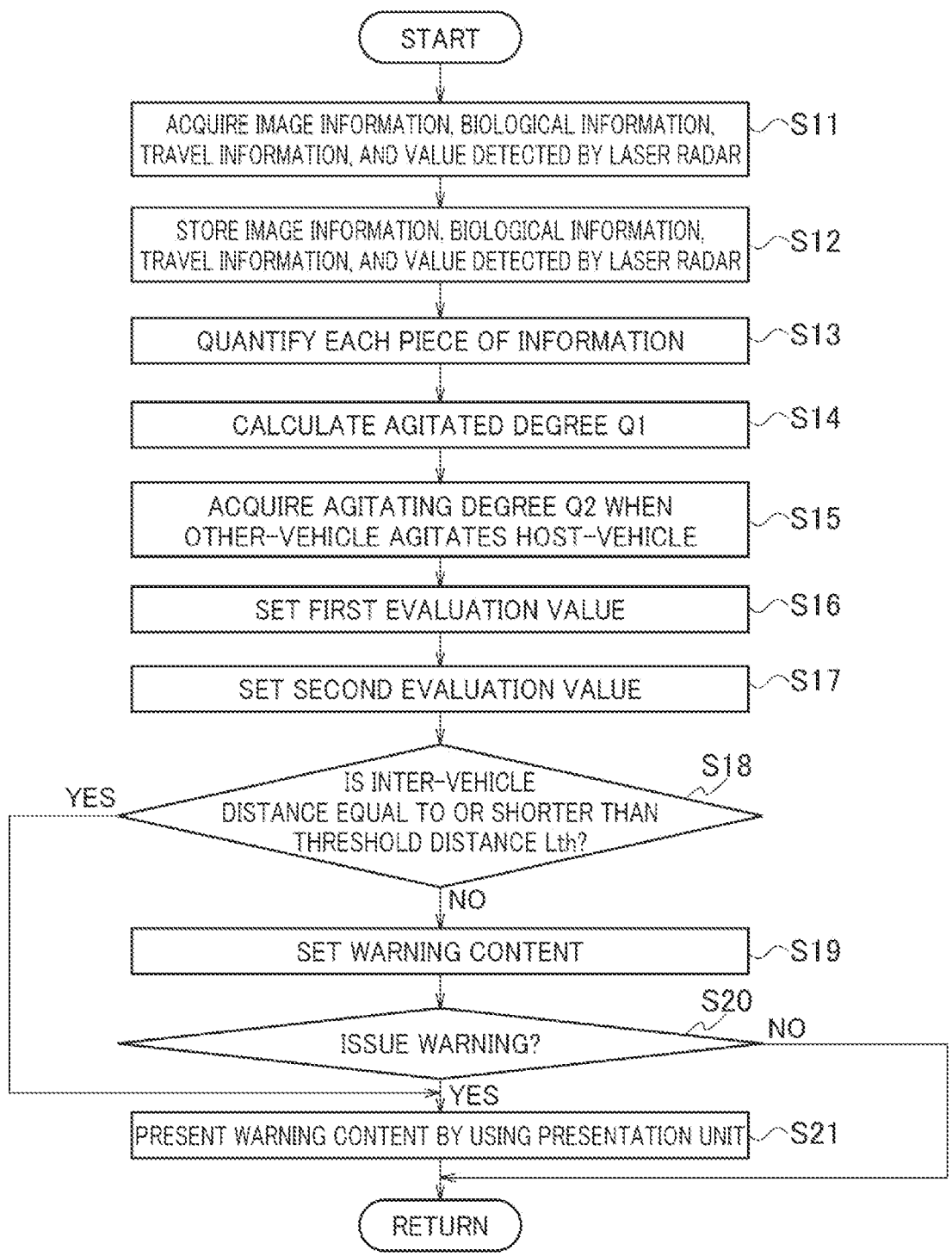
FIG. 9 is a flowchart illustrating a processing procedure of a dangerous driving warning system according to a first embodiment.

Next, the operation of a first embodiment will be described with reference to the flowchart shown in FIG. 9. FIG. 9 is a flowchart showing a processing procedure of the dangerous driving warning system 101 according to a first embodiment. First, in step S11 of FIG. 9, the controller 11A acquires various pieces of information detected by means of the camera unit 12A, the biological information sensor 13A, the travel information sensor 14A, and the laser radars 15A mounted on the host-vehicle device 1A.

In step S12, the controller 11A stores various pieces of information acquired through the process of step S11 in the storage unit 315A.

In step S13, the agitated degree calculation unit 313A refers to the agitated degree correspondence table Tb1 and quantifies the above various pieces of information. As shown in FIG. 5B, if the traveling speed of the host-vehicle VA is in the range from 60 to 70 [km/h], the score is "1", for example.

In step S14, the agitated degree calculation unit 313A calculates the agitated degree Q1. Specifically, the agitated degree calculation unit 313A calculates the agitated degree Q1, which is the degree to which the driver of the host-vehicle VA is agitated by the other-vehicle VB by using the above described equation (2). The agitated degree Q1 can be calculated by using the numerical value at the determination time (instantaneous). Further, in addition to the above, it is possible to set a time zone that is backward by a predetermined time (for example, 10 seconds) from the determination time and to use representative values such as an average value, a peak value, and a median value of the agitated degree Q1 during the time zone, for example. Further, it is possible to hold the peak value during the time zone for a predetermined time (for example, 10 seconds) to obtain the agitated degree Q1.

In step S15, the communication unit 32A acquires the data of the agitating degree Q2 calculated by means of the other-vehicle device 1B. As described above, the agitating degree calculation unit 314B of the other-vehicle device 1B calculates the agitating degree Q2 when the other-vehicle VB agitates the driver of the host-vehicle VA. Specifically, the agitating degree Q2 is calculated by using the above described equation (4). The data of the agitating degree Q2 is transmitted to the server 3 via the network 4, and further transmitted to the host-vehicle device 1A. The communication unit 32A receives the data of the agitating degree Q2. The agitating degree Q2 can be calculated by using a numerical value at the determination time (instantaneous) in the same manner as the agitated degree Q1 described above. In addition to the above, it is also possible to set a time zone that is backward by a predetermined time (for example, 10 seconds) from the determination time and to use representative values such as an average value, a peak value, and a median value of the agitating degree Q2 during the time zone. It is also possible to hold the peak value during the time zone for a predetermined time (for example, 10 seconds) to obtain the agitating degree Q2.

In step S16, the danger degree determination unit 312A sets the first evaluation value Xp based on the agitated degree Q1 calculated in the process of step S14. Specifically, the danger degree determination unit 312A sets any one of X0 to X3 shown in FIG. 7A as the first evaluation value Xp.

In step S17, the danger degree determination unit 312A sets the second evaluation value Yp based on the agitating degree Q2 obtained in the process of step S15. Specifically, the danger degree determination unit 312A sets any one of Y0 to Y3 shown in FIG. 7B as the second evaluation value Yp.

In step S18, the danger degree determination unit 312A, based on the distance between the host-vehicle VA and the other-vehicle VB, determines whether the inter-vehicle distance is equal to or shorter than a preset threshold distance Lth. If the inter-vehicle distance is equal to or shorter than the threshold distance Lth (S18; YES), the process proceeds to step S21. Alternatively, if the inter-vehicle distance is longer than the threshold distance Lth, (S18); NO), the process proceeds to step S19.

In step S19, the danger degree determination unit 312A sets the warning content given to the driver of the host-vehicle VA based on the first evaluation value Xp and the second evaluation value Yp. The danger degree determination unit 312A determines the warning content in accordance with the first evaluation value Xp under the condition that the second evaluation value Yp is Y1 or above, for example.

FIG. 8A shows the warning content when the driver of the host-vehicle VA is agitated by the other-vehicle VB. As shown in FIG. 8A, "No warning" is set as the content when the first evaluation value Xp is X0. When the first evaluation value Xp is in the range from X1 to X3, warning content in accordance with each evaluation value is set.

In step S20, the danger degree determination unit 312A determines whether to warn the driver of the host-vehicle VA that the driver of the host-vehicle VA is agitated. If the second evaluation value Yp is Y0 or the first evaluation value Xp is X0, the danger degree determination unit 312A makes no warning to the driver (S20; NO), and therefore the process ends.

Meanwhile, if the second evaluation value Yp is Y1 or above and the first evaluation value Xp is X1 or above, in step S21, the danger degree determination unit 312A presents the warning content in accordance with the first evaluation value Xp by using the presentation unit 33A.

The case where the presentation unit 33A is a display is taken as an example here. In the above case, if the first evaluation value Xp is X1, the presentation unit 33A displays the text such as "Please drive safely", for example. If the first evaluation value Xp is X2, the presentation unit 33A displays the text such as "Please travel carefully", for example. If the first evaluation value Xp is X3, the presentation unit 33A displays the text such as "Dangerous driving has been detected. Please pay attention to surrounding vehicles", for example. That is, the higher the first evaluation value Xp is, the stronger the calling for attention is.

Further, suppose that the inter-vehicle distance is equal to or shorter than the threshold distance (S18; YES), for example. In the above case, the presentation unit 33A presents content such as "There is an abnormally close vehicle. Please be careful." by using text or voice. That is, if the inter-vehicle distance is short and the other-vehicle VB is abnormally close to the host-vehicle VA, the warning is displayed regardless of the magnitude of the agitated degree Q1. Thereafter, the process ends.

In this way, it is possible to determine whether the driver of the host-vehicle VA is agitated by the other-vehicle VB based on various kinds of pieces of information on the host-vehicle VA and various kinds of pieces of information on the other-vehicle VB, and to present, to the driver of the host-vehicle VA, the warning content in accordance with the agitated degree Q1.

Description of Effect of a First Embodiment

In this way, the dangerous driving warning system 101 according to a first embodiment can achieve the following effects.

(1) The agitated degree Q1 indicating the degree to which the driver of the host-vehicle VA is agitated by the other-vehicle VB is calculated. Further, the agitating degree Q2 indicating the degree to which the other-vehicle VB agitates the driver of the host-vehicle VA is calculated. The driver of the host-vehicle VA is warned that the host-vehicle is agitated based on the agitated degree Q1 and the agitating degree Q2. Accordingly, the driver of the host-vehicle VA can immediately recognize that the host-vehicle VA is agitated, and can quickly take measures to avoid danger.

(2) The agitating degree Q2 when the other-vehicle VB agitates the driver of the host-vehicle VA is calculated by means of the agitating degree calculation unit 314B of the other-vehicle VB. The host-vehicle device 1A acquires the agitating degree Q2 by means of communication via the network 4. This can reduce the calculation load in the host-vehicle device 1A.

(3) Information on the host-vehicle VA includes information on a type of the host-vehicle and information on the lane on which the host-vehicle travels. If the host-vehicle VA is a light vehicle and the host-vehicle VA is traveling on the passing lane, it is determined that the driver of the host-vehicle is likely to be agitated, for example. Therefore, the multiplication coefficient used for calculating the agitated degree Q1 is set to a higher value. Therefore, the agitated degree Q1 can be calculated with higher accuracy.

(4) Information on the other-vehicle VB includes vehicle type information, vehicle body information, and information on the lane on which the other-vehicle travels. If the other-vehicle VB is a large vehicle or is traveling on the passing lane, it is determined that that the other-vehicle VB is likely to perform an agitation action, for example. Therefore, the multiplication coefficient used for calculating the agitating degree Q2 is set to a higher numerical value. In addition, if the other-vehicle VB caused many accidents and violations in the past, it is determined that the other-vehicle VB is likely to perform the agitation action. Therefore, the multiplication coefficient used for calculating the agitating degree Q2 is set to a higher numerical value. Accordingly, the agitating degree Q2 can be calculated with higher accuracy.

(5) The agitated degree Q1 and the agitating degree Q2 are calculated by using the traveling speed of a vehicle, the number of sudden accelerations, the acceleration degree, the frequency of inattentive driving, and the number of sudden steering movements as the vehicle information. Suppose that the traveling speed is high, the number of sudden accelerations is large, or the acceleration degree is high. In the above case, it is determined that the possibility of a driver of a vehicle being agitated or performing an agitation action is high. Therefore, the scores for calculating the agitated degree Q1 and the agitating degree Q2 are set to be high. Accordingly, the agitated degree Q1 and the agitating degree Q2 can be calculated with high accuracy.

(6) The agitated degree Q1 and the agitating degree Q2 are calculated by using the heart rate, the breathing rate, and the blood pressure of the driver as the biological information. Suppose that the driver's heart rate is high, the breathing rate is high, or the blood pressure is high. In the above case, it is determined that the possibility of the driver being agitated or performing an agitation action is high. Therefore, the scores for calculating the agitated degree Q1 and the agitating degree Q2 are set to be high. Accordingly, the agitated degree Q1 and the agitating degree Q2 can be calculated with high accuracy.

Description of First Modified Example of a First Embodiment

Next, a first modified example of a first embodiment described above will be described. In the first modified example, the control unit 21 of the server 3 shown in FIG. 4 is configured to include a danger degree determination unit similar to the danger degree determination unit 312A. In addition, the first modified example of a first embodiment differs from a first embodiment described above in that the storage unit 23 of the server 3 stores the agitated degree correspondence table Tb1, the agitating degree correspondence table Tb2, the first evaluation value table TB1, and the second evaluation value table TB2.

In the first modified example, various kinds of pieces of information detected by means of the host-vehicle device 1A (biological information, travel information, images, laser radar information, and the like) are transmitted from the communication unit 32A to the server 3 via the network 4. Then, the control unit 21 of the server 3 calculates the agitated degree Q1. Further, various kinds of pieces of information detected by means of the other-vehicle device 1B are transmitted from the communication unit 32B to the server 3 via the network 4. Then, the control unit 21 of the server 3 calculates the agitating degree Q2. Other configurations other than the above are the same as those of a first embodiment described above.

As described above, in the dangerous driving warning system 101 according to the first modified example, the agitated degree correspondence table Tb1 and the agitating degree correspondence table Tb2 are provided in the server 3. The agitated degree Q1 and the agitating degree Q2 are calculated in the server 3. Accordingly, it is possible to reduce the storage capacity and the calculation load of the storage units 315A and 315B mounted on the host-vehicle device 1A and the other-vehicle device 1B respectively.

Description of Second Modified Example of a First Embodiment

Next, a second modified example of a first embodiment described above will be described. The configuration of the device is the same as that in FIGS. 1 to 4, and therefore the description of the configuration is omitted.

In a first embodiment described above, the agitating degree calculation unit 314B mounted on the other-vehicle VB is configured to calculate the agitating degree Q2 of an agitation action performed by the other-vehicle VB against the host-vehicle VA and transmit the calculated agitating degree Q2 to the host-vehicle VA via the network 4. Meanwhile, in the second modified example, various kinds of pieces of information detected by means of the other-vehicle device 1B are transmitted to the host-vehicle device 1A via the network 4. The difference between the second modified example of a first embodiment and a first embodiment resides in that the agitating degree calculation unit 314A mounted on the host-vehicle device 1A calculates the agitating degree Q2 of an agitation action performed by the other-vehicle VB.

Hereinafter, the processing procedure of a dangerous driving warning system 101 according to the second modified example will be described with reference to the flow-chart shown in FIG. 10.

Figure 10:
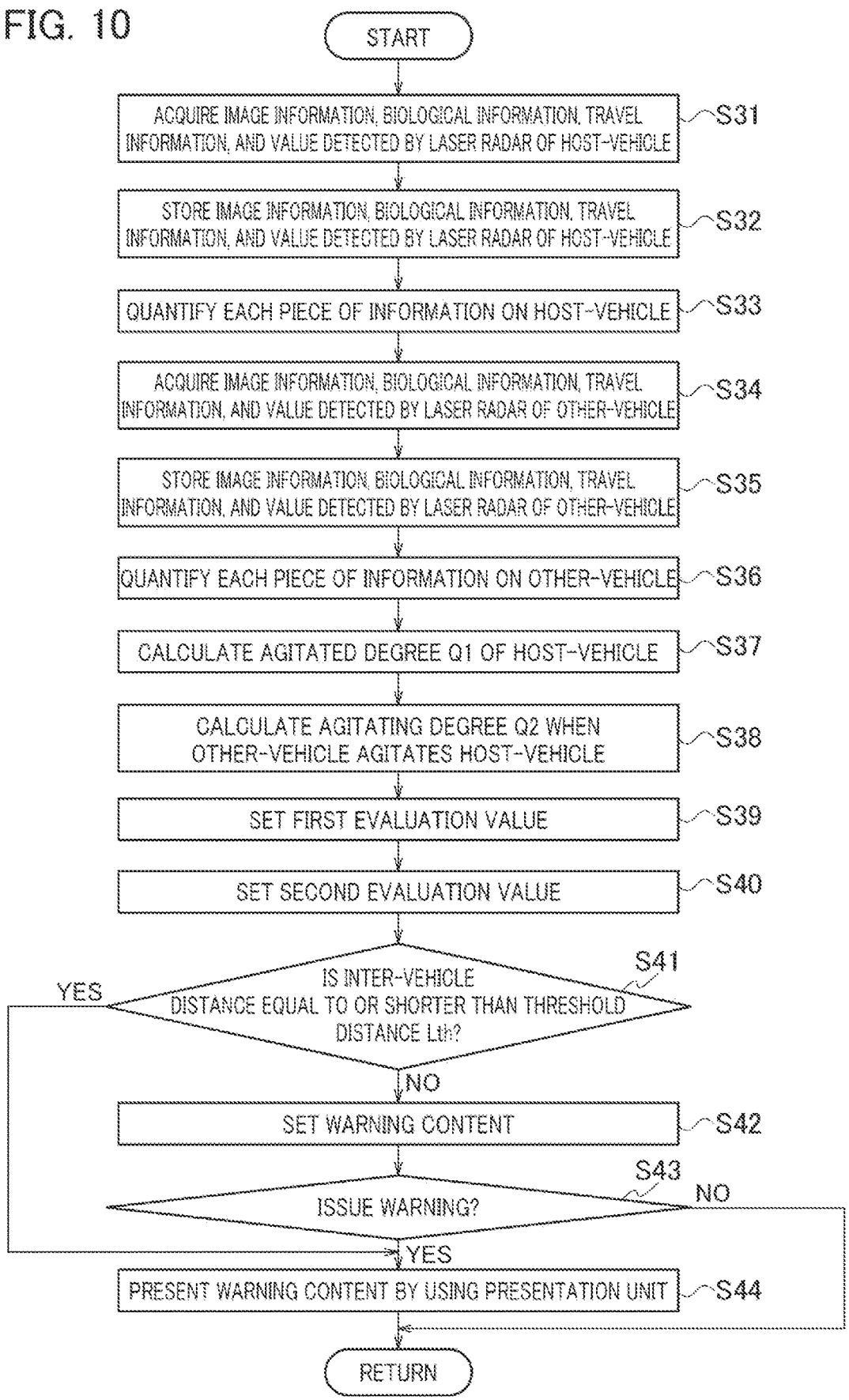
FIG. 10 is a flowchart illustrating a processing procedure of a dangerous driving warning system according to a second modified example of a first embodiment.

First, in step S31 of FIG. 10, the controller 11A mounted on the host-vehicle device 1A acquires various pieces of information detected by means of the camera unit 12A, the biological information sensor 13A, the travel information sensor 14A, and the laser radars 15A.

In step S32, the controller 11A stores various pieces of information acquired in the process of step S31 in the storage unit 315A.

In step S33, the agitated degree calculation unit 313A refers to the agitated degree correspondence table Tb1 and quantifies the various pieces of information described above.

In step S34, the controller 11A of the host-vehicle device 1A acquires various pieces of information detected by means of the camera unit 12B, the biological information sensor 13B, the travel information sensor 14B, and the laser radars 15B mounted on the other-vehicle device 1B. Specifically, the communication unit 32A of the host-vehicle device 1A receives various kinds of pieces of data transmitted from the communication unit 32B of the other-vehicle device 1B.

In step S35, the controller 11A stores the various pieces of information acquired in the process of step S34 in the storage unit 315A.

In step S36, the agitating degree calculation unit 314A refers to the agitating degree correspondence table Tb2 and quantifies the above described various pieces of information.

In step S37, the agitated degree calculation unit 313A calculates the agitated degree Q1. Specifically, the agitated degree calculation unit 313A calculates the agitated degree Q1, which is the degree to which the driver of the host-vehicle VA is agitated by the other-vehicle VB by using the above described equation (2). The agitated degree Q1 can be calculated by using the numerical value at the determination time (instantaneous). In addition to the above, it is possible to set a time zone that is backward by a predetermined time (for example, 10 seconds) from the determination time and to use representative values such as an average value, a peak value, and a median value of the agitated degree Q1 during the time zone. It is also possible to hold the peak value during the time zone for a predetermined time (for example, 10 seconds) to obtain the agitated degree Q1.

In step S38, the agitating degree calculation unit 314A calculates the agitating degree Q2. Specifically, the agitating degree calculation unit 314A calculates the agitating degree Q2 when the other-vehicle VB agitates the driver of the host-vehicle VA by using the above described equation (4). The agitating degree Q2 can be calculated by using the numerical value at the determination time (instantaneous). In addition to the above, it is also possible to set a time zone that is backward by a predetermined time (for example, 10 seconds) from the determination time, and to use representative values such as an average value, a peak value, and a median value of the agitating degree Q2 during the time zone. It is also possible to hold the peak value during the time zone for a predetermined time (for example, 10 seconds) to obtain the agitating degree Q2.

In step S39, the danger degree determination unit 312A sets the first evaluation value Xp based on the agitated degree Q1 calculated in the process of step S37. Specifically, the danger degree determination unit 312A sets an evaluation value of any one of X0 to X3 shown in FIG. 7A as the first evaluation value Xp.

In step S40, the danger degree determination unit 312A sets the second evaluation value Yp based on the agitating degree Q2 obtained in the process of step S38. Specifically, the danger degree determination unit 312A sets an evaluation value of any one of Y0 to Y3 shown in FIG. 7B as the second evaluation value Yp.

Since the processes of steps S41 to S44 are the same as the processes of steps S18 to S21 shown in FIG. 9, description thereof is omitted.

In this way, in a dangerous driving warning system 101 according to the second modified example of a first embodiment, the agitated degree calculation unit 313A of the host-vehicle device 1A calculates the agitated degree Q1 when the driver of the host-vehicle VA is agitated by the other-vehicle VB. In addition, the agitating degree calculation unit 314A acquires various kinds of pieces of information on the other-vehicle VB from the other-vehicle VB, and calculates the agitating degree Q2 when the other-vehicle VB agitates the driver of the host-vehicle VA by using the acquired pieces of information.

Therefore, since the agitated degree Q1 and the agitating degree Q2 can be calculated by means of the host-vehicle device 1A, the calculation load in the other-vehicle VB can be reduced.

Description of a Second Embodiment

Next, a second embodiment will be described. Since a dangerous driving warning system 101 according to a second embodiment is the same as the dangerous driving warning system 101 shown in FIGS. 1 to 4 described above, a description of the configuration thereof is omitted. In a second embodiment, if the host-vehicle VA agitates the driver of the other-vehicle VB, the driver of the host-vehicle VA is warned of the danger degree caused by the driver performing the agitation action.

The processing procedure of the dangerous driving warning system 101 according to a second embodiment will be described below with reference to the flowchart shown in FIG. 11. First, in step S51 of FIG. 11, the controller 11A acquires various pieces of information detected by means of a camera unit 12A, a biological information sensor 13A, a travel information sensor 14A, and laser radars 15A mounted on a host-vehicle device 1A.

In step S52, the controller 11A stores the various pieces of information acquired in the process of step S51 in a storage unit 315A.

In step S53, the agitating degree calculation unit 314A refers to the agitating degree correspondence table Tb2 and quantifies the above described various pieces of information. As shown in FIG. 6B, if the number of accelerations of the host-vehicle VA is five times or more in 10 seconds, the score is "5", for example.

In step S54, the agitating degree calculation unit 314A calculates the agitating degree Q2. Specifically, the agitating degree calculation unit 314A calculates the agitating degree Q2 when the host-vehicle VA agitates the driver of the other-vehicle VB by using the above described equation (4). The agitating degree Q2 can be calculated by using the numerical value at the determination time (instantaneous). In addition to the above, it is also possible to set a time zone that is backward by a predetermined time (for example, 10 seconds) from the determination time, and to use representative values such as an average value, a peak value, and a median value of the agitating degree Q2 during the time zone. It is also possible to hold the peak value during the time zone for a predetermined time (for example, 10 seconds) to obtain the agitating degree Q2.

In step S55, the communication unit 32A acquires data of the agitated degree Q1 calculated by means of the other-vehicle device 1B. As described above, the agitated degree calculation unit 313B of the other-vehicle device 1B calculates the agitated degree Q1 when the driver of the other-vehicle VB is agitated by the host-vehicle VA. Specifically, the agitated degree Q1 is calculated by using the above described equation (2). The data of the agitated degree Q1 is transmitted to the server 3 via the network 4, and further transmitted to the host-vehicle device 1A. The communication unit 32A receives the data of the agitated degree Q1. The agitated degree Q1 can be calculated by using the numerical value at the determination time (instantaneous). In addition to the above, it is also possible to set a time zone that is backward by a predetermined time (for example, 10 seconds) from the determination time, and to use representative values such as an average value, a peak value, and a median value of the agitated degree Q1 during the time zone. It is also possible to hold the peak value during the time zone for a predetermined time (for example, 10 seconds) to obtain the agitated degree Q1.

In step S56, the danger degree determination unit 312A sets the first evaluation value Xp based on the agitated degree Q1 acquired in the process of step S55. Specifically, the danger degree determination unit 312A sets an evaluation value of any one of X0 to X3 shown in FIG. 7A as the first evaluation value Xp.

In step 557, the danger degree determination unit 312A sets the second evaluation value Yp based on the agitating degree Q2 calculated in the process of step S54. Specifically, the danger degree determination unit 312A sets an evaluation value of any one of Y0 to Y3 shown in FIG. 7B as the second evaluation value Yp.

In step S58, the danger degree determination unit 312A determines, based on the distance between the host-vehicle VA and the other-vehicle VB, whether the inter-vehicle distance is equal to or shorter than a preset threshold distance Lth. If the inter-vehicle distance is equal to or shorter than the threshold distance Lth (S58; YES), the process proceeds to step S61. If the inter-vehicle distance is longer than the threshold distance Lth (S58; NO), the process proceeds to step S59.

In step S59, the danger degree determination unit 312A sets the warning content given to the driver of the host-vehicle VA based on the first evaluation value Xp and the second evaluation value Yp. The danger degree determination unit 312A determines the warning content in accordance with the second evaluation value Yp under the condition that the first evaluation value Xp is X1 or above, for example.

FIG. 8B shows the warning content when the host-vehicle VA agitates the driver of the other-vehicle VB. As shown in FIG. 8B, "No warning" is set as the content when the second evaluation value Yp is Y0. Further, when the second evaluation value Yp is in the range from Y1 to Y3, warning content in accordance with each evaluation value is set.

In step S60, the danger degree determination unit 312A determines whether to warn the driver of the host-vehicle VA that the host-vehicle VA is performing an agitation action. If the first evaluation value Xp is X0 or the second evaluation value Yp is Y0, no warning is made (S60; NO), and therefore the process ends.

Meanwhile, suppose that the first evaluation value Xp is X1 or above (that is, in a situation where the driver of other-vehicle VB recognizes that the driver is agitated) and the second evaluation value Yp is Y1 or above. In the above case, in step S61, the danger degree determination unit 312A presents the warning in accordance with the second evaluation value Yp by using the presentation unit 33A.

The case where the presentation unit 33A is a display is taken as an example. In the above case, as shown in FIG. 8B, when the second evaluation value Yp is Y1, the display displays the text such as "Please drive safely". When the second evaluation value Yp is Y2, the display displays the text such as "Please travel carefully", for example. When the second evaluation value Yp is Y3, the display displays the text such as "Dangerous driving has been detected. Please adopt a safe inter-vehicle distance", for example.

Further, if the inter-vehicle distance becomes equal to or shorter than the threshold distance Lth (S58; YES), content such as "We are abnormally close to a preceding vehicle. Please drive by adopting a sufficient distance with the preceding vehicle." is presented by using text or voice, for example. That is, if the inter-vehicle distance is short and the host-vehicle VA is abnormally close to the other-vehicle VB, the warning is displayed regardless of the magnitude of the agitating degree Q2. Thereafter, the process ends.

In this way, it is possible to determine whether the host-vehicle VA agitates the driver of the other-vehicle VB based on various kinds of pieces of information on the host-vehicle VA and various kinds of pieces of information on the other-vehicle VB, and to present the warning content in accordance with the agitation action degree to the driver of the host-vehicle VA.

In this way, in the dangerous driving warning system 101 according to a second embodiment, the following effects can be achieved.

(1) The agitating degree Q2 indicating the degree to which the host-vehicle VA agitates the driver of the other-vehicle VB is calculated. Further, the agitated degree Q1 indicating the degree to which the driver of the other-vehicle VB is agitated by the host-vehicle VA is calculated. Then, the host-vehicle VA is warned that the host-vehicle VA is performing an agitation action based on the agitating degree Q2 and the agitated degree Q1. Therefore, if the driver of the host-vehicle VA unconsciously agitates the other-vehicle VB, the driver of the host-vehicle VA can immediately recognize that the driver is performing the agitation action, and can quickly take measures for safe driving.

(2) The agitated degree Q1 when the driver of the other-vehicle VB is agitated by the host-vehicle VA is calculated by means of the agitated degree calculation unit 313B of the other-vehicle VB and is acquired by the host-vehicle device 1A by means of communication via the network 4. This can reduce the calculation load in the host-vehicle device 1A.

(3) Information on the host-vehicle VA includes information on a type of the host-vehicle, vehicle body information such as the number of violations and accidents, and information on the lane on which the host-vehicle travels. If the host-vehicle VA is a large vehicle or if the host-vehicle is traveling on a passing lane, it is determined that the host-vehicle is likely to perform an agitation action, for example. Therefore, the multiplication coefficient used for calculating the agitating degree Q2 is set to a higher numerical value. In addition, if the host-vehicle VA caused many accidents and violations in the past, it is determined that the host-vehicle is likely to perform an agitation action. Therefore, the multiplication coefficient used for calculating the agitating degree Q2 is set to a higher numerical value. Further, if the host-vehicle VA is traveling on the passing lane, it is determined that the host-vehicle is likely to agitate the driver of the other-vehicle VB. Therefore, the multiplication coefficient used for calculating the agitating degree Q2 is set to a high numerical value. Accordingly, the agitating degree Q2 can be calculated with higher accuracy.

(4) Information on the other-vehicle VB includes information on the type of the other-vehicle VB and information on the lane on which the other-vehicle VB travels. If the other-vehicle VB is a light vehicle or is traveling on a passing lane, it is determined that the driver of the other-vehicle VB is likely to be agitated, for example. Therefore, the multiplication coefficient used for calculating the agitated degree Q1 is set to a higher numerical value. Accordingly, the agitated degree Q1 can be calculated with higher accuracy.

(5) The agitating degree Q2 and the agitated degree Q1 are calculated by using, as vehicle information, a traveling speed, the number of sudden accelerations, the acceleration degree, the frequency of inattentive driving, and the number of sudden steering movements of a vehicle. If the traveling speed is high, the number of sudden accelerations is large, or the acceleration degree is high, it is determined that a vehicle is likely to perform an agitation action or is likely to be agitated. Therefore, the scores used for calculating the agitating degree Q2 and the agitated degree Q1 are set to be high. Accordingly, the agitating degree Q2 and the agitated degree Q1 can be calculated with high accuracy.

(6) The agitating degree Q2 and the agitated degree Q1 are calculated by using, as biological information, the heart rate, breathing rate, and blood pressure of the driver. If the driver's heart rate is high, the driver's breathing rate is high, or the driver's blood pressure is high, it is determined that the driver is likely to perform an agitation action or is likely to be agitated. Therefore, the scores used for calculating the agitating degree Q2 and the agitated degree Q1 are set to be high. Accordingly, the agitating degree Q2 and the agitated degree Q1 can be calculated with high accuracy.

Description of First Modified Example of a Second Embodiment

Next, a first modified example of a second embodiment described above will be described. In a first modified example, a control unit 21 of a server 3 shown in FIG. 4 is configured to include a danger degree determination unit. In addition, the first modified example of a second embodiment differs from a second embodiment in that, in the first modified example, a storage unit 23 of the server 3 stores an agitated degree correspondence table Tb1, an agitating degree correspondence table Tb2, a first evaluation value table TB1, and a second evaluation value table TB2.

In the first modified example, various kinds of pieces of information (biological information, travel information, images, laser radar information, and the like) detected by means of the host-vehicle device 1A are transmitted from the communication unit 32A to the server 3 via the network 4. Then, the control unit 21 of the server 3 calculates the agitating degree Q2. Further, various kinds of pieces of information detected by means of the other-vehicle device 1B are transmitted from the communication unit 32B to the server 3 via the network 4. Then, the control unit 21 of the server 3 calculates the agitated degree Q1. Configurations other than the above are the same as those in a second embodiment described above.

As described above, in a dangerous driving warning system 101 according to the first modified example, the agitated degree correspondence table Tb1 and the agitating degree correspondence table Tb2 are stored in the server 3, and the server 3 calculates the agitating degree Q2 and the agitated degree Q1. This can reduce the storage capacity and the calculation load of the storage units 315A and 315B mounted on the host-vehicle device 1A and the other-vehicle device 1B respectively.

Description of Second Modified Example of a Second Embodiment

Next, a second modified example of a second embodiment described above will be described. The configuration of the device is the same as that in FIGS. 1 to 4 described above, and therefore a description of the configuration is omitted.

In a second embodiment described above, it is configured that the agitated degree calculation unit 313B mounted on the other-vehicle VB calculates the agitated degree Q1 of an agitation action performed by the host-vehicle VA against the other-vehicle VB, and transmits the calculated agitated degree Q1 to the host-vehicle VA via the network 4. Meanwhile, the second modified example of a second embodiment differs from a second embodiment in that, in the second modified example, various kinds of pieces of information detected by means of the other-vehicle device 1B are transmitted to the host-vehicle device 1A via the network 4, and then the calculation processing unit 31A mounted on the host-vehicle device 1A calculates the agitated degree Q1 of an agitation action performed against the other-vehicle VB.

Figure 12:
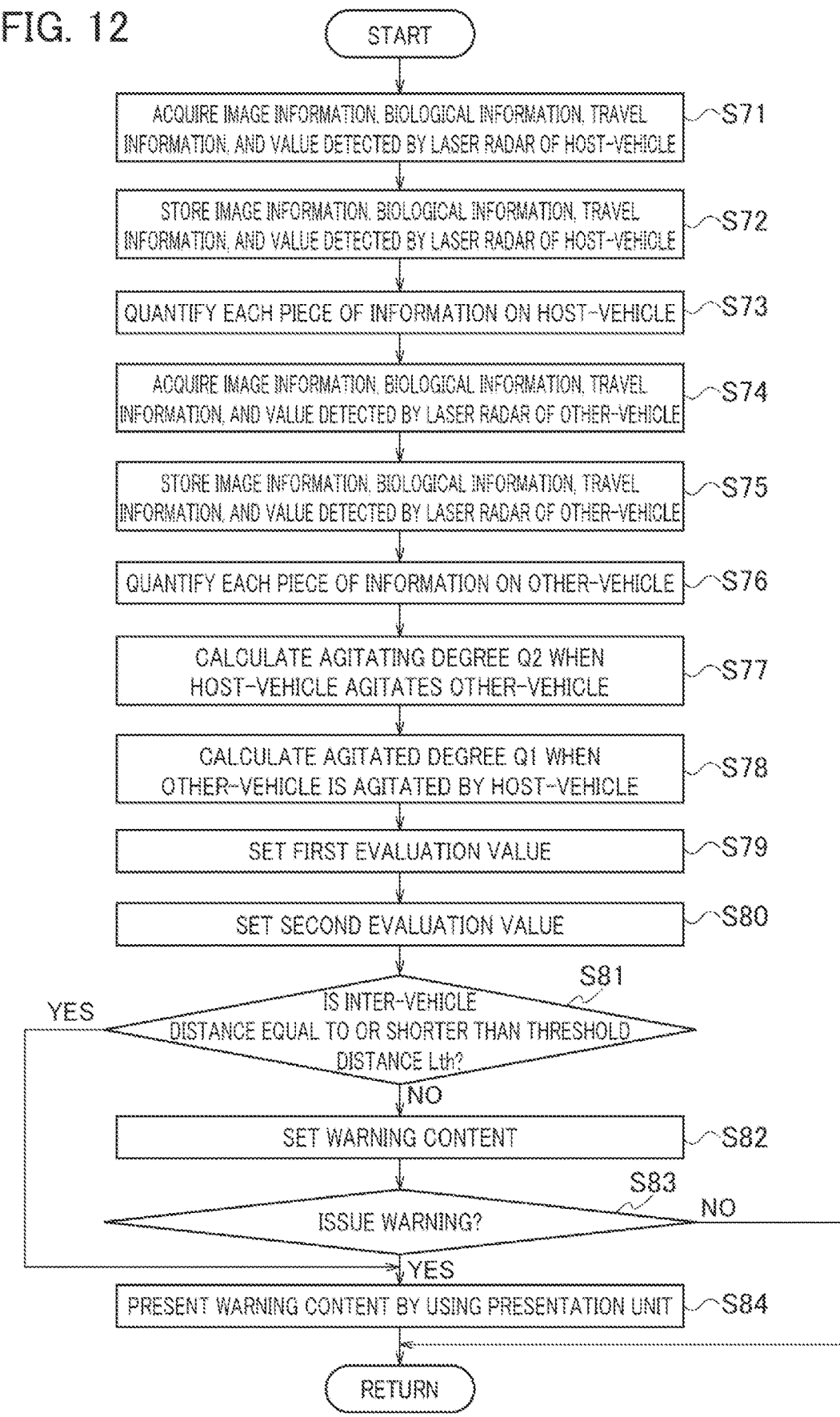
FIG. 12 is a flowchart illustrating a processing procedure of a dangerous driving warning system according to a second modified example of a second embodiment.

Hereinafter, the processing procedure of a dangerous driving warning system 101 according to the second modified example will be described with reference to the flowchart shown in FIG. 12. First, in step S71 of FIG. 12, the controller 11A acquires various pieces of information detected by means of the camera unit 12A, the biological information sensor 13A, the travel information sensor 14A, and the laser radars 15A mounted on the host-vehicle device 1A.

In step S72, the controller 11A stores the various pieces of information acquired in the process of step S71 in the storage unit 315A.

In step S73, the agitated degree calculation unit 313A refers to the agitated degree correspondence table Tb1 and quantifies the above described various pieces of information.

In step S74, the controller 11A acquires various pieces of information detected by means of the camera unit 12B, the biological information sensor 13B, the travel information sensor 14B, and the laser radars 15B mounted on the other-vehicle device 1B. Specifically, the communication unit 32A of the host-vehicle device 1A receives the various kinds of pieces of data transmitted from the communication unit 32B of the other-vehicle device 1B.

In step 375, the controller 11A stores the various pieces of information acquired in the process of step S74 in the storage unit 315A.

In step S76, the agitating degree calculation unit 314A refers to the agitating degree correspondence table Tb2 and quantifies the above described various pieces of information.

In step S77, the agitating degree calculation unit 314A calculates the agitating degree Q2. Specifically, the agitating degree calculation unit 314A calculates the agitating degree Q2 when the host-vehicle VA agitates the driver of the other-vehicle VB by using the above described equation (4). The agitating degree Q2 can be calculated by using the numerical value at the determination time (instantaneous). In addition to the above, it is also possible to set a time zone that is backward by a predetermined time (for example, 10 seconds) from the determination time, and to use representative values such as an average value, a peak value, and a median value of the agitating degree Q2 during the time zone. It is also possible to hold the peak value during the time zone for a predetermined time (for example, 10 seconds) to obtain the agitating degree Q2.

In step S78, the agitated degree calculation unit 313A calculates the agitated degree Q1. Specifically, the agitated degree calculation unit 313A calculates the agitated degree Q1 when the driver of the other-vehicle VB is agitated by the host-vehicle VA by using the above described equation (2). The agitated degree Q1 can be calculated by using the numerical value at the determination time (instantaneous). In addition to the above, it is also possible to set a time zone that is backward by a predetermined time (for example, 10 seconds) from the determination time, and to use representative values such as an average value, a peak value, and a median value of the agitated degree Q1 during the time zone. It is also possible to hold the peak value during the time zone for a predetermined time (for example, 10 seconds) to obtain the agitated degree Q1.

In step S79, the danger degree determination unit 312A sets the first evaluation value Xp based on the agitated degree Q1 acquired in the process of step S78. Specifically, the danger degree determination unit 312A sets an evaluation value of any one of X0 to X3 shown in FIG. 7A as the first evaluation value Xp.

In step S80, the danger degree determination unit 312A sets the second evaluation value Yp based on the agitating degree Q2 calculated in the process of step S77. Specifically, the danger degree determination unit 312A sets an evaluation value of any one of Y0 to Y3 shown in FIG. 7B as the second evaluation value Yp.

Figure 11:
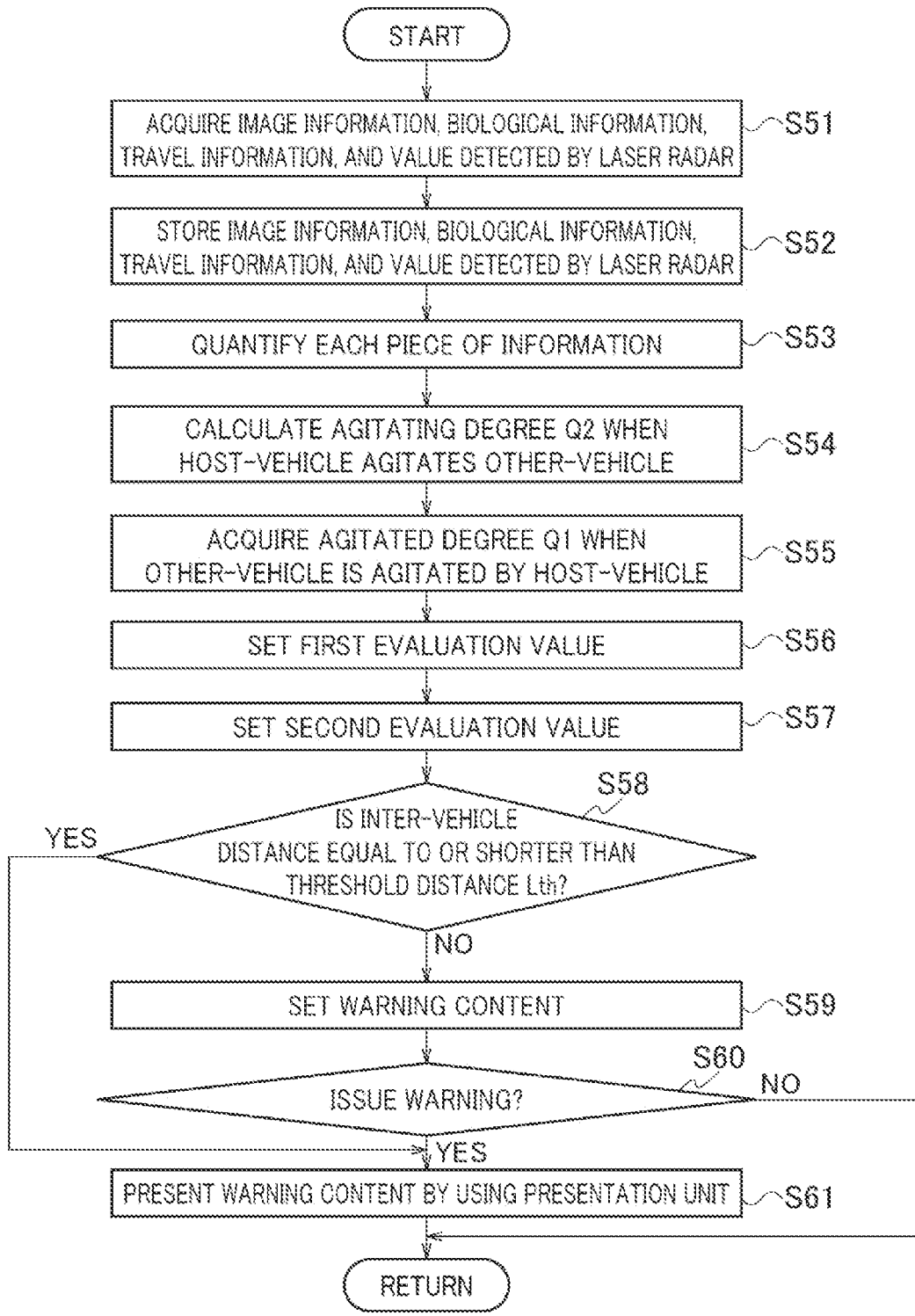
FIG. 11 is a flowchart illustrating a processing procedure of a dangerous driving warning system according to a second embodiment.

Since the processes in steps S81 to S84 are the same as the processes in steps S58 to S61 shown in FIG. 11, description thereof is omitted.

In this way, in the dangerous driving warning system 101 according to the second modified example of a second embodiment, the host-vehicle VA calculates the agitating degree Q2 when the host-vehicle VA agitates the driver of the other-vehicle VB. Further, the host-vehicle VA receives various kinds of pieces of information on the other-vehicle VB from the other-vehicle VB, and calculates the agitated degree Q1 when the driver of the other-vehicle VB is agitated by the host-vehicle VA by using the acquired information.

As described above, the host-vehicle device 1A can calculate the agitating degree Q2 and the agitated degree Q1. This can reduce the calculation load of the other-vehicle device 1B.

Description of a Third Embodiment

Next, a third embodiment will be described. Since a dangerous driving warning system 101 according to a third embodiment is the same as the dangerous driving warning system 101 shown in FIGS. 1 to 4 described above, a configuration description thereof is omitted.

However, the agitating degree calculation unit 314A shown in FIG. 2 is a first agitating degree calculation unit for calculating the agitating degree Q2 (a first agitating degree) indicating the degree to which the host-vehicle VA agitates the driver of the other-vehicle VB. Further, the agitating degree calculation unit 314B shown in FIG. 3 is a second agitating degree calculation unit for calculating the agitating degree Q2' (a second agitating degree) indicating the degree to which the other-vehicle VB agitates the driver of the host-vehicle VA. In a third embodiment, when both the driver of the host-vehicle VA and the driver of the other-vehicle VB agitate each other, the driver of at least one of the host-vehicle VA and the other-vehicle VB is warned of the danger degree caused by performing the agitation action.

That is, while a first embodiment described above shows countermeasures when the driver of the host-vehicle VA is agitated by the other-vehicle VB, a second embodiment shows countermeasures when the host-vehicle VA agitates the driver of the other-vehicle VB. In contrast to the above, in a third embodiment, when the driver of the host-vehicle VA and the driver of the other-vehicle VB agitate each other, processes are performed for warning the driver of at least one of the host-vehicle VA and the other-vehicle VB.

The processing procedure of a dangerous driving warning system 101 according to a third embodiment will be described below with reference to the flowchart shown in FIG. 13. First, in step S91 of FIG. 13, the controller 11A acquires various pieces of information detected by means of the camera unit 12A, the biological information sensor 13A, the travel information sensor 14A, and the laser radars 15A mounted on the host-vehicle device 1A.

In step S92, the controller 11A stores the various pieces of information acquired in the process of step S91 in the storage unit 315A.

In step S93, the agitating degree calculation unit 314A (a first agitating degree calculation unit) refers to the agitating degree correspondence table Tb2 and quantifies the above described various pieces of information. As shown in FIG. 6B, if the number of accelerations of the host-vehicle VA is 5 times or more in 10 seconds, the score is "5", for example.

In step S94, the agitating degree calculation unit 314A calculates the agitating degree Q2 (a first agitating degree). Specifically, the agitating degree calculation unit 314A calculates a first agitating degree Q2, which is the degree to which the host-vehicle VA agitates the driver of the other-vehicle VB by using the above described equation (4). The first agitating degree Q2 can be calculated by using the numerical value at the determination time (instantaneous). In addition to the above, it is also possible to set a time zone that is backward by a predetermined time (for example, 10 seconds) from the determination time, and to use representative values such as an average value, a peak value, and a median value of the first agitating degree Q2 during the time zone. It is also possible to hold the peak value during the time zone for a predetermined time (for example, 10 seconds) to obtain the first agitating degree Q2.

In step S95, the communication unit 32A acquires data of the agitating degree calculated by means of the agitating degree calculation unit 314B (a second agitating degree calculation unit) of the other-vehicle device 1B (a second agitating degree; this is denoted with "Q2'"). As described above, the agitating degree calculation unit 314B of the other-vehicle device 1B calculates the second agitating degree Q2' when the other-vehicle VB agitates the driver of the host-vehicle VA. Specifically, the second agitating degree Q2' is calculated by using the above described equation (4). The data of the second agitating degree Q2' is transmitted to the server 3 via the network 4, and further transmitted to the host-vehicle device 1A. The communication unit 32A receives the data of the second agitating degree Q2'. The second agitating degree Q2' can be calculated by using the numerical value at the determination time (instantaneous). In addition to the above, it is also possible to set a time zone that is backward by a predetermined time (for example, 10 seconds) from the determination time, and to use representative values such as an average value, a peak value, and a median value of the second agitating degree Q2' during the time zone. It is also possible to hold the peak value during the time zone for a predetermined time (for example, 10 seconds) to obtain the second agitating degree Q2'.

In step S96, the danger degree determination unit 312A sets a second evaluation value (this is denoted with "Yp1") of the host-vehicle VA based on the first agitating degree Q2 calculated in the process of step S94. Specifically, the danger degree determination unit 312A sets an evaluation value of any one of Y0 to Y3 shown in FIG. 7B as the second evaluation value Yp1 of the host-vehicle VA.

In step 597, the danger degree determination unit 312A sets a second evaluation value (this is denoted with "Yp2") of the other-vehicle VB based on the second agitating degree Q2' acquired in the process of step S95. Specifically, the danger degree determination unit 312A sets an evaluation value of any one of Y0 to Y3 shown in FIG. 7B as the second evaluation value Yp2 of the other-vehicle VB.

In step S98, the danger degree determination unit 312A determines, based on the distance between the host-vehicle VA and the other-vehicle VB, whether the inter-vehicle distance is equal to or shorter than a preset threshold distance Lth. If the inter-vehicle distance is equal to or shorter than the threshold distance Lth (S98; YES), the process proceeds to step S101. If the inter-vehicle distance is longer than the threshold distance Lth (S98; NO), the process proceeds to step 399.

In step S99, the danger degree determination unit 312A sets the warning content given to the driver of the host-vehicle VA based on the second evaluation value Yp1 of the host-vehicle VA and the second evaluation value Yp2 of the other-vehicle VB. The danger degree determination unit 312A determines the warning content in accordance with the second evaluation value Yp1 of the host-vehicle VA under the condition that the second evaluation value Yp2 of the other-vehicle VB is Y1 or above, for example.

As shown in FIG. 8B, when the second evaluation value Yp1 of the host-vehicle VA is Y0, "No warning" is set as the content. Further, when the second evaluation value Yp1 of the host-vehicle VA is in the range from Y1 to Y3, warning content in accordance with each evaluation value is set.

In step S100, the danger degree determination unit 312A determines whether to warn the driver of the host-vehicle VA that the host-vehicle is performing an agitation action. If the second evaluation value Yp2 of the other-vehicle VB is Y0 or if the second evaluation value Yp1 of the host-vehicle VA is Y0, no warning is made (3100; NO), and therefore the process ends.

Meanwhile, suppose that the second evaluation value Yp2 of the other-vehicle VB is Y1 or above (that is, the driver of the other-vehicle VB is performing an agitation action) and the second evaluation value Yp1 of the host-vehicle VA is Y1 or above. In the above case, in step 3101, the danger degree determination unit 312A presents the warning in accordance with the second evaluation value Yp1 of the host-vehicle VA by using the presentation unit 33A.

The case where the presentation unit 33A is a display is taken as an example. As shown in FIG. 8B, when the second evaluation value Yp1 of the host-vehicle VA is Y1, the display displays the text such as "Please drive safely". When the second evaluation value Yp1 is Y2, the display displays the text such as "Please travel carefully", for example. When the second evaluation value Yp1 is Y3, the display displays the text such as "Dangerous driving has been detected. Please adopt a safe inter-vehicle distance", for example.

Further, if the inter-vehicle distance becomes equal to or shorter than the threshold distance Lth (S98; YES), the content such as "A preceding vehicle is abnormally close.

Please drive by adopting a sufficient distance with the preceding vehicle" is presented by using text or voice, for example. Thereafter, the process ends.

In this way, it is possible to determine whether the driver of the host-vehicle VA and the driver of the other-vehicle VB agitate each other based on various kinds of pieces of information on the host-vehicle VA and various kinds of pieces of information on the other-vehicle VB, and to present warning content in accordance with the agitation action degree to the driver of the host-vehicle VA.

In this way, in the dangerous driving warning system 101 according to a third embodiment, the following effects can be achieved.

(1) The first agitating degree Q2 indicating the degree to which the host-vehicle VA is agitating the driver of the other-vehicle VB is calculated. Further, the second agitating degree Q2' indicating the degree to which the other-vehicle VB is agitating the driver of the host-vehicle VA is calculated. Then, based on both of the agitating degrees Q2 and Q2', the driver of the host-vehicle is warned that the driver of the host-vehicle VA and the driver of the other-vehicle VB are agitating each other. Accordingly, the driver of the host-vehicle VA can immediately recognize that the driver of the host-vehicle VA and the driver of the other-vehicle VB are agitating each other, and can quickly take measures to avoid danger.

(2) The second agitating degree Q2' when the other-vehicle VB agitates the driver of the host-vehicle VA is calculated by means of the agitating degree calculation unit 314B of the other-vehicle VB and then acquired by the host-vehicle device 1A by means of communication. This can reduce the calculation load in the host-vehicle VA.

(3) Information on the host-vehicle VA and the other-vehicle VB includes vehicle type information, vehicle body information, and information on a lane on which the host-vehicle VA and the other-vehicle VB are to travel. Suppose that the host-vehicle VA or the other-vehicle VB is a large vehicle or is traveling on a passing lane, for example. In the above case, it is determined that the host-vehicle VA or the other-vehicle VB is likely to perform an agitation action.

Therefore, the multiplication coefficient used for calculating the agitating degrees Q2 and Q2' is set to a higher numerical value. Further, suppose that the host-vehicle VA or the other-vehicle VB has caused many violations and accidents in the past. In the above case, it is determined that the host-vehicle VA or the other-vehicle VB is likely to perform an agitation action. Therefore, the multiplication coefficient used for calculating the agitating degrees Q2 and Q2' is set to a higher numerical value. Accordingly, the agitating degrees Q2 and Q2' can be calculated with higher accuracy.

(4) Both of the agitating degrees Q2 and Q2' are calculated by using, as vehicle information, the travelling speed, the number of sudden accelerations, the acceleration degree, the frequency of inattentive driving, and the number of sudden steering movements of a vehicle. If the traveling speed is high, the number of sudden accelerations is large, or the acceleration degree is high, it is determined that a vehicle is likely to perform an agitation action. Therefore, the scores used for calculating both of the agitating degrees Q2 and Q2' are set to be high. Accordingly, both of the agitating degrees Q2 and Q2' can be calculated with high accuracy.

(5) Both of the agitating degrees Q2 and Q2' are calculated by using, as biological information, the driver's heart rate, breathing rate, and blood pressure. If the driver's heart rate is high, the driver's breathing rate is high, and the driver's blood pressure is high, it is determined that the driver is likely to perform an agitation action. Therefore, the scores used for calculating both of the agitating degrees Q2 and Q2' are set to be high. Accordingly, both of the agitating degrees Q2 and Q2' can be calculated with high accuracy.

Description of First Modified Example of a Third Embodiment

Next, a first modified example of a third embodiment described above will be described. In the first modified example, a control unit 21 of the server 3 shown in FIG. 4 is configured to include a danger degree determination unit. Further, the first modified example of a third embodiment differs from a third embodiment described above in that, in the first modified example, a storage unit 23 of the server 3 stores an agitated degree correspondence table Tb1, an agitating degree correspondence table Tb2, a first evaluation value table TB1, and a second evaluation value table TB2.

In the first modified example, various kinds of pieces of information (biological information, travel information, images, laser radar information, and the like) detected by means of the host-vehicle device 1A are transmitted from the communication unit 32A to the server 3 via the network 4. Then, the control unit 21 of the server 3 calculates a first agitating degree Q2 of an agitation action performed by the host-vehicle VA. Further, various kinds of pieces of information detected by means of the other-vehicle device 1B are transmitted from the communication unit 32B to the server 3 via the network 4. Then, the control unit 21 of the server 3 calculates a second agitating degree Q2' of an agitation action performed by the other-vehicle VB. Configurations other than the above are the same as those in a second embodiment.

In this way, in a dangerous driving warning system 101 according to the first modified example, the agitated degree correspondence table Tb1 and the agitating degree correspondence table Tb2 are stored in the server 3. Further, the server 3 calculates the first agitating degree Q2 of an agitation action performed by the host-vehicle VA and the second agitating degree Q2' of an agitation action performed by the other-vehicle VB. This can reduce the storage capacity and the calculation load of the storage units 315A and 315B mounted on the host-vehicle device 1A and the other-vehicle device 1B respectively.

Description of Second Modified Example of a Third Embodiment

Next, a second modified example of a third embodiment described above will be described. The configuration of the device is the same as that in FIGS. 1 to 4 described above, and therefore a description of the configuration is omitted.

A third embodiment described above is configured such that the agitating degree calculation unit 314B mounted on the other-vehicle VB calculates the second agitating degree Q2' of the agitation action performed by the other-vehicle VB against the host-vehicle VA, and the calculated second agitating degree Q2' is transmitted to the host-vehicle VA via the network 4. Meanwhile, the second modified example of a third embodiment differs from a third embodiment in that, in the second modified example, various kinds of pieces of information detected by means of the other-vehicle device 1B are transmitted to the host-vehicle device 1A via the network 4, and the calculation processing unit 31A mounted on the host-vehicle device 1A calculates the second agitating degree Q2' of the agitation action performed by the other-vehicle VB against the host-vehicle VA.

Figure 14:
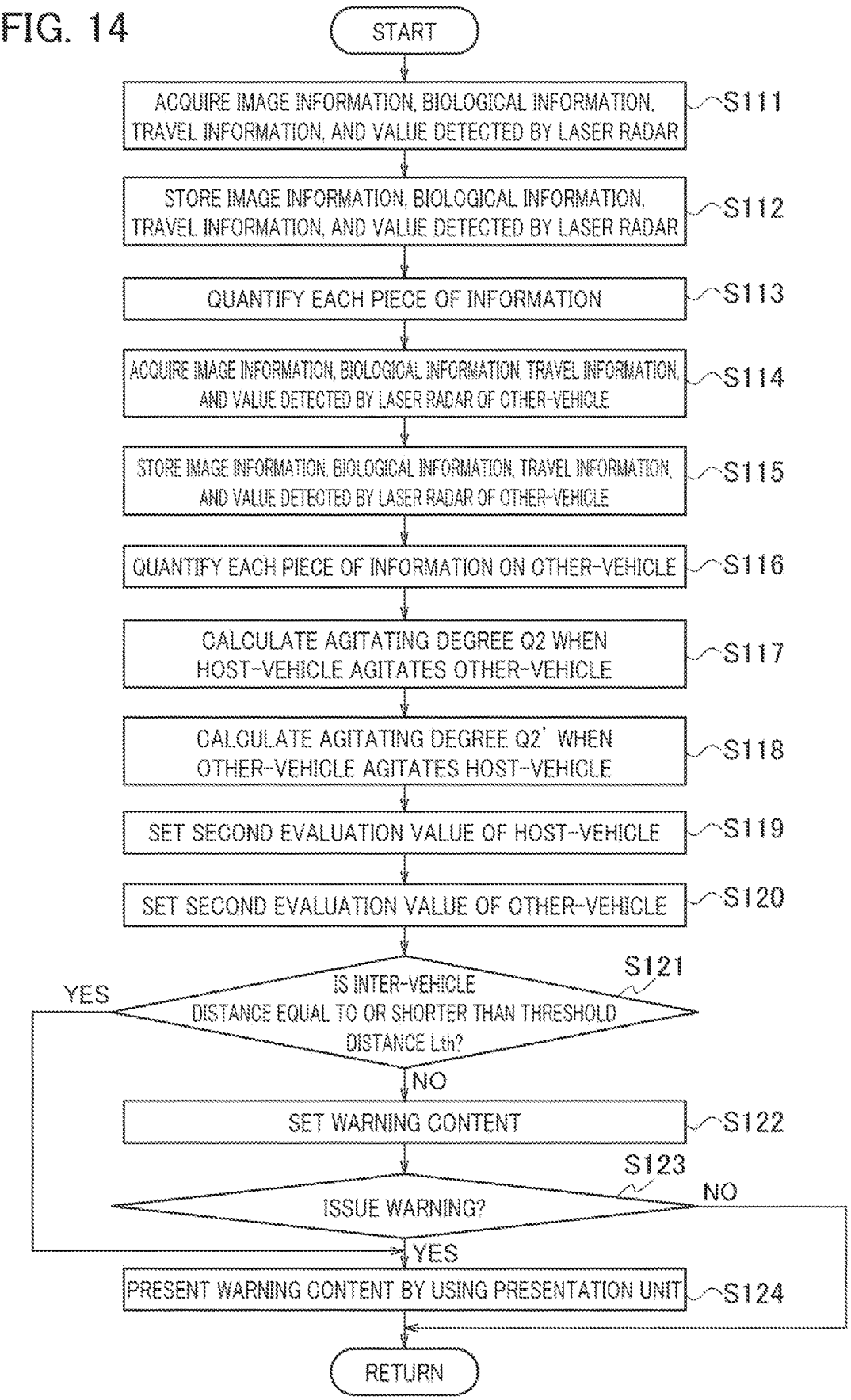
FIG. 14 is a flowchart illustrating a processing procedure of a dangerous driving warning system according to a second modified example of a third embodiment.

Hereinafter, the processing procedure of a dangerous driving warning system 101 according to the second modified example will be described with reference to the flowchart shown in FIG. 14. First, in step S111 of FIG. 14, a controller 11A acquires various pieces of information detected by means of a camera unit 12A, a biological information sensor 13A, a travel information sensor 14A, and laser radars 15A mounted on a host-vehicle device 1A.

In step S112, the controller 11A stores the various pieces of information acquired in the process of step S111 in a storage unit 315A.

In step S113, an agitating degree calculation unit 314A refers to an agitating degree correspondence table Tb2 and quantifies the above described various pieces of information.

In step S114, the host-vehicle acquires various pieces of information detected by means of a camera unit 12B, a biological information sensor 13B, a travel information sensor 14B, and laser radars 15B mounted on an other-vehicle device 1B. Specifically, a communication unit 32A of the host-vehicle device 1A receives the various kinds of pieces of data transmitted from the communication unit 32B of the other-vehicle device 1B.

In step S115, the controller 11A stores the various pieces of information acquired in the process of step S114 in the storage unit 315A.

In step S116, the agitating degree calculation unit 314A refers to the agitating degree correspondence table Tb2 and quantifies the above described various pieces of information.

In step S117, the agitating degree calculation unit 314A calculates the first agitating degree Q2 of the host-vehicle VA. Specifically, the agitating degree calculation unit 314A calculates the first agitating degree Q2, which is the degree to which the host-vehicle VA agitates the driver of the other-vehicle VB by using the above described equation (4). The first agitating degree Q2 can be calculated by using the numerical value at the determination time (instantaneous). In addition to the above, it is also possible to set a time zone that is backward by a predetermined time (for example, 10 seconds) from the determination time, and to use representative values such as an average value, a peak value, and a median value of the first agitating degree Q2 during the time zone. It is also possible to hold the peak value during the time zone for a predetermined time (for example, 10 seconds) to obtain the first agitating degree Q2.

In step S118, the agitating degree calculation unit 314A calculates the second agitating degree Q2' of an agitation action performed by the other-vehicle VB. Specifically, the agitating degree calculation unit 314A calculates the second agitating degree Q2', which is the degree of an agitation action performed by the other-vehicle VB against the host-vehicle VA by using the above described equation (4). The second agitating degree Q2' can be calculated by using the numerical value at the determination time (instantaneous). In addition to the above, it is also possible to set a time zone that is backward by a predetermined time (for example, 10 seconds) from the determination time, and to use representative values such as an average value, a peak value, and a median value of the second agitating degree Q2' during the time zone. It is also possible to hold the peak value during the time zone for a predetermined time (for example, 10 seconds) to obtain the second agitating degree Q2'.

In step S119, the danger degree determination unit 312A sets a second evaluation value Yp1 of the host-vehicle VA based on the first agitating degree Q2 calculated in the process of step S117. Specifically, the danger degree determination unit 312A sets an evaluation value of any one of Y0 to Y3 shown in FIG. 7A as the second evaluation value Yp1 of the host-vehicle VA.

In step S120, the danger degree determination unit 312A sets the second evaluation value Yp2 of the other-vehicle VB based on the second agitating degree Q2' of the other-vehicle VB calculated in the process of step S118. Specifically, the danger degree determination unit 312A sets an evaluation value of any one of Y0 to Y3 shown in FIG. 7B as the second evaluation value Yp2 of the other-vehicle VB.

Figure 13:
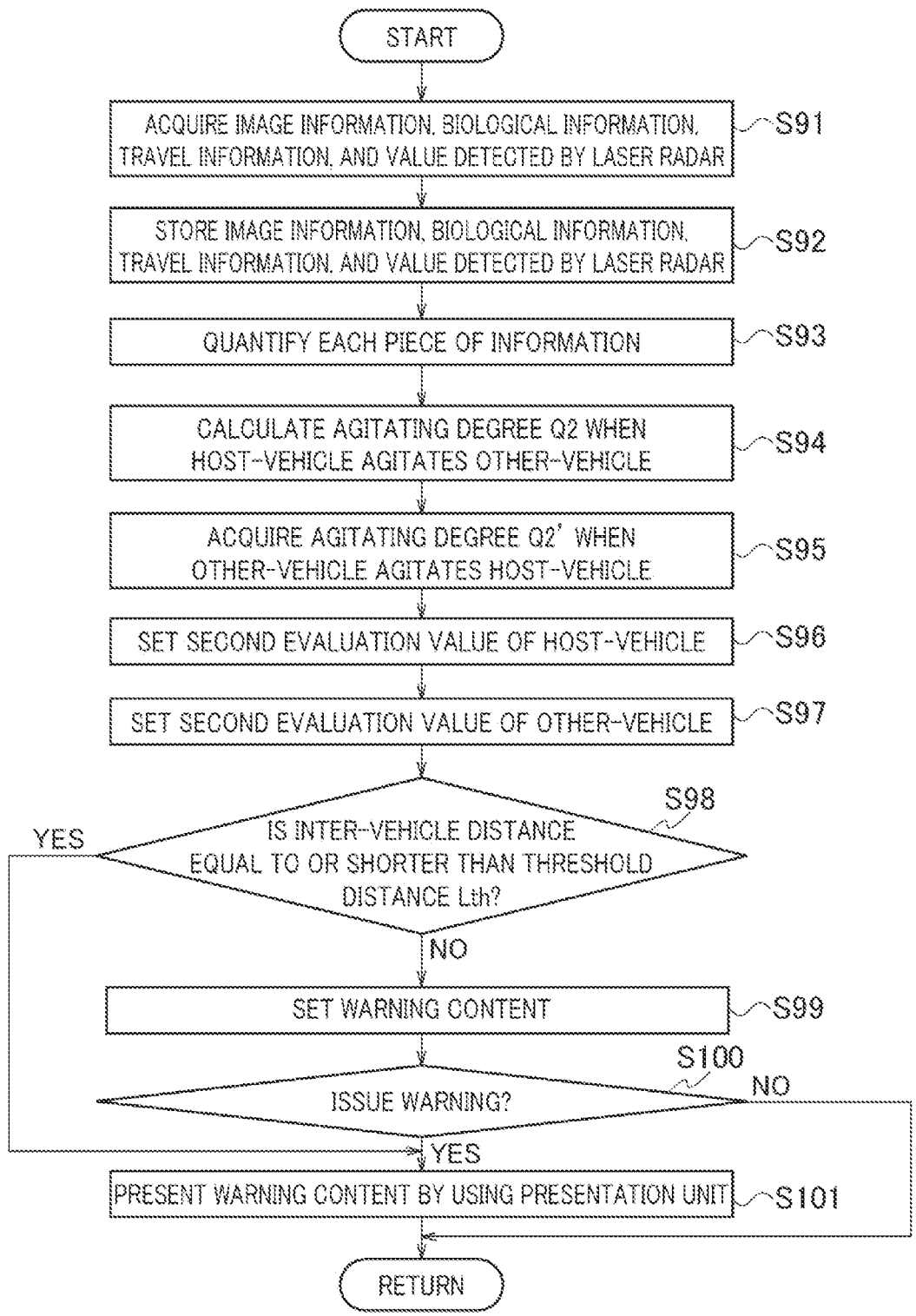
FIG. 13 is a flowchart illustrating a processing procedure of a dangerous driving warning system according to a third embodiment.

The processes in steps S121 to S124 are the same as the processes in steps S98 to S101 shown in FIG. 13, and therefore a description thereof is omitted.

In this way, in a dangerous driving warning system 101 according to the second modified example of a third embodiment, the first agitating degree Q2 when the host-vehicle VA agitates the driver of the other-vehicle VB is calculated. Further, various kinds of pieces of information on the other-vehicle VB are acquired from the other-vehicle VB, and the second agitating degree Q2' when the other-vehicle VB agitates the driver of the host-vehicle VA is calculated by using the acquired pieces of information.

Therefore, both of the agitating degrees Q2 and Q2' can be calculated by means of the host-vehicle device 1A. This can reduce the calculation load of the other-vehicle device 1B.

As described above, according to embodiments, it is possible to notify a vehicle that a host-vehicle is agitated by an other-vehicle, that a host-vehicle agitates an other-vehicle, or that both a host-vehicle and an other-vehicle agitate each other.

Although embodiments of the present invention have been described above, it should not be understood that the statements and drawings forming part of this disclosure are intended to limit the present invention. Various alternative embodiments, examples, and operational techniques will be apparent to those skilled in the art from this disclosure.

This application claims priority under Japanese Patent Application Nos. 2020-052863, 2020-052864, and 2020-052866 filed with the Japan Patent Office on Mar. 24, 2020, the entire contents of all of which are incorporated herein by reference.

What is claimed is:

1. A dangerous driving warning device that warns a host-vehicle that the host-vehicle is agitated by an other-vehicle, the dangerous driving warning device comprising:
 a host-vehicle information acquisition unit configured to acquire host-vehicle information including at least one of travel information of the host-vehicle, biological information of a driver of the host-vehicle, and a facial expression of the driver of the host-vehicle;
 a communication unit configured to acquire an agitating degree indicating a degree to which the other-vehicle is agitating the host-vehicle, by means of radio communication, the agitating degree based on travel information of the other-vehicle, biological information of a driver of the other-vehicle, and acquired information identifying a facial expression of the driver of the other-vehicle:
 an agitated degree calculation unit configured to calculate an agitated degree indicating a degree to which the host-vehicle is agitated by the other-vehicle, based on the travel information of the host-vehicle, the biological information of the driver of the host-vehicle, and the identified facial expression of the driver of the host-vehicle included in the host-vehicle information;

a danger degree determination unit configured to provide a first evaluation value indicating a degree to which the driver of the host-vehicle is agitated by the other-vehicle and a second evaluation value indicating a degree to which the host-vehicle agitates the driver of the other-vehicle, based on the agitated degree and the agitating degree; and a presentation unit configured to warn the host-vehicle of a warning content according to the first evaluation value when the second evaluation value is equal to or above a predetermined degree, by means of an image, a text, a voice, light, or vibration.

2. The dangerous driving warning device according to claim 1, wherein
the host-vehicle information further includes at least one of information on a type of the host-vehicle and information on a lane on which the host-vehicle is traveling.

3. The dangerous driving warning device according to claim 1, wherein
the travel information includes at least one of a speed of the host-vehicle, a number of sudden accelerations per unit time of the host-vehicle, a sudden acceleration degree of the host-vehicle, a frequency of inattentive driving of the host-vehicle, and a number of sudden steering movements per unit time of the host-vehicle, and the biological information includes at least one of a heart rate of the driver, a breathing rate of the driver, and a blood pressure of the driver.

4. A dangerous driving warning method of warning a vehicle that the host-vehicle is agitated by an other-vehicle, the dangerous driving method comprising the steps of:

acquiring host-vehicle information including at least one of travel information of the host-vehicle, biological information of a driver of the host-vehicle, and a facial expression of the driver of the host-vehicle;

acquiring an agitating degree indicating a degree to which the other-vehicle is agitating the host-vehicle, the agitating degree based on travel information of the other-vehicle, biological information of a driver of the other-vehicle, and acquired information identifying a facial expression of the driver of the other-vehicle:

calculating an agitated degree indicating a degree to which the host-vehicle is agitated by the other-vehicle, based on the travel information of the host-vehicle, the biological information of the driver of the host-vehicle, and the identified facial expression of the driver of the host-vehicle included in the host-vehicle information;

providing a first evaluation value indicating a degree to which the driver of the host-vehicle is agitated by the other-vehicle and a second evaluation value indicating a degree to which the host-vehicle agitates the driver of the other-vehicle, based on the agitated degree and the agitating degree; and warning the host-vehicle of a warning content according to the first evaluation value when the second evaluation value is equal to or above a predetermined degree, by means of an image, a text, a voice, light, or vibration.

5. A dangerous driving warning method of warning a vehicle that a host-vehicle is agitated by an other-vehicle, the dangerous driving method comprising:

acquiring host-vehicle information including at least one of travel information of the host-vehicle, biological information of a driver of the host-vehicle, and a facial expression of the driver of the host-vehicle;

acquiring an agitating degree indicating a degree to which the other-vehicle is agitating the host-vehicle, the agitating degree based on travel information of the other-vehicle, biological information of a driver of the other-vehicle, and acquired information identifying a facial expression of the driver of the other-vehicle:

calculating an agitated degree indicating a degree to which the host-vehicle is agitated by the other-vehicle, based on the travel information of the host-vehicle, the biological information of the driver of the host-vehicle, and the identified facial expression of the driver of the host-vehicle included in the host-vehicle information;

providing a first evaluation value indicating a degree to which the driver of the host-vehicle is agitated by the other-vehicle and a second evaluation value indicating a degree to which the host-vehicle agitates the driver of the other-vehicle, based on the agitated degree and the agitating degree; and warning the host-vehicle of a warning content according to the first evaluation value when the second evaluation value is equal to or above a predetermined degree, by means of an image, a text, a voice, light, or vibration.

\* \* \* \* \*